Figure 1A:
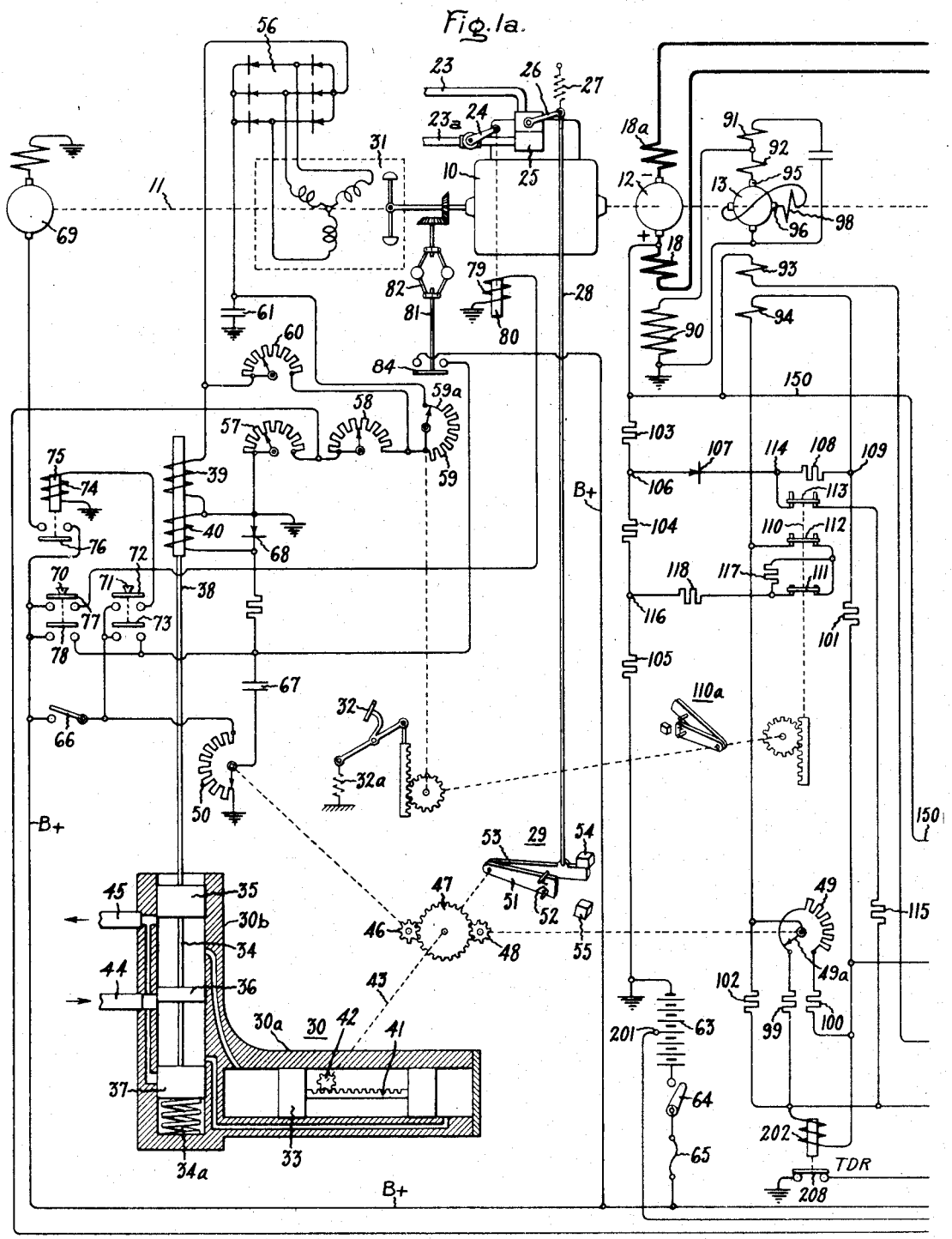

Inventors:
George M. Adams,
Harold G. Moore,
by Harry E. Dunham
Their Attorney.

Jan. 29, 1946. G. M. ADAMS ET AL 2,393,622
ELECTRIC CONTROL SYSTEM
Filed May 1, 1944 4 Sheets-Sheet 3
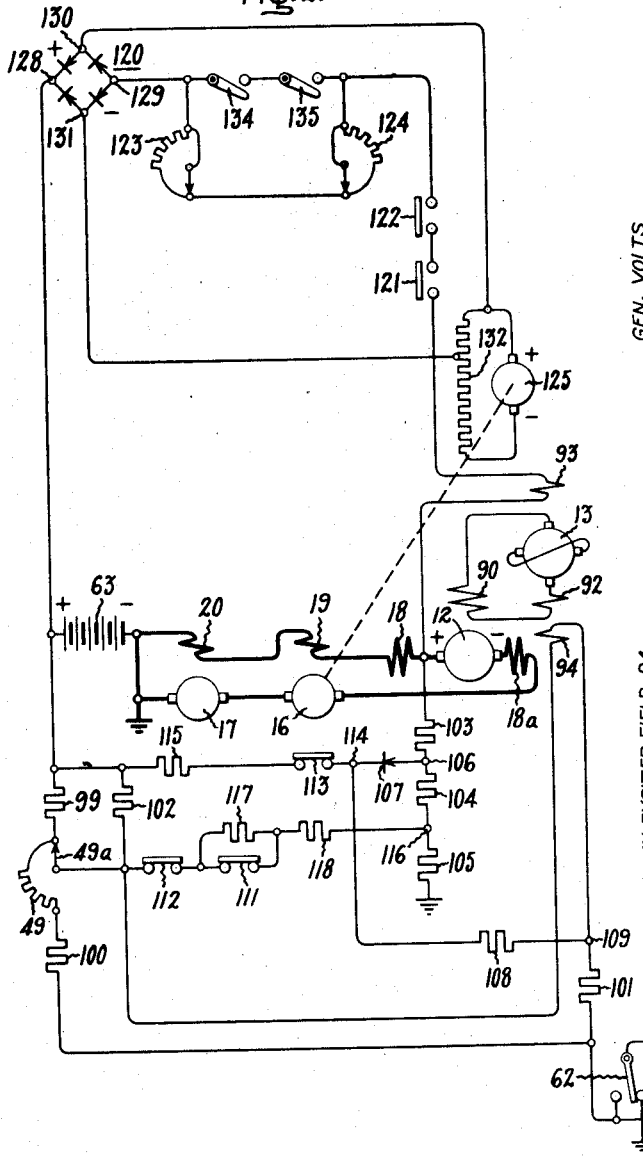
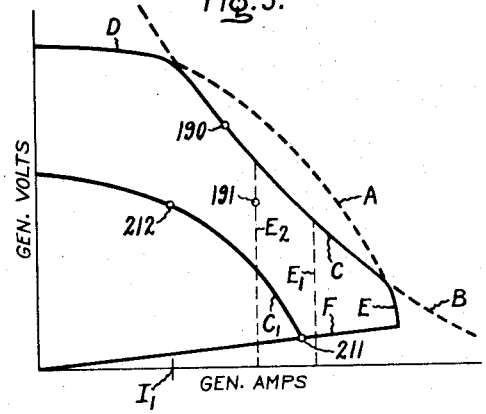
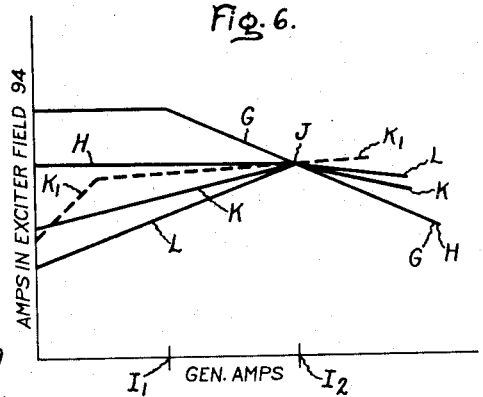
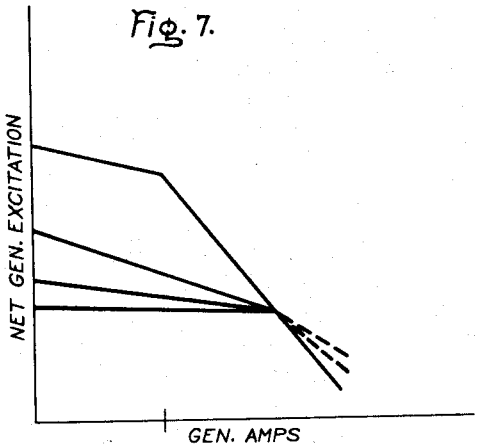
Inventors:
George M. Adams,
Harold G. Moore,
by Harry E. Dunham
Their Attorney.

Jan. 29, 1946.  G. M. ADAMS ET AL  2,393,622
ELECTRIC CONTROL SYSTEM
Filed May 1, 1944  4 Sheets-Sheet 4

Inventors:
George M. Adams,
Harold G. Moore,
by Harry E. Dunham
Their Attorney.

UNITED STATES PATENT OFFICE 2,393,622

ELECTRIC CONTROL SYSTEM

George M. Adams, Erie, and Harold G. Moore, Wesleyville, Pa., assignors to General Electric Company, a corporation of New York Application May 1, 1944, Serial No. 533,578

69 Claims. (Cl. 290—17)

Our invention relates to electric control systems, and is particularly applicable to prime mover-generator electric power systems, such as gas- or Diesel-electric power systems, for self-propelled vehicles.

The control system forming the subject matter of this application constitutes an improvement upon the system described and claimed in copending applications Serial No. 469,538, filed on December 19, 1942, as a joint application of Martin A. Edwards, Donald E. Garr, John C. Aydelott, and George M. Adams and later amended as a joint application of Martin A. Edwards, Donald E. Garr, and John C. Aydelott; Serial No. 505,437, filed October 8, 1943, for Martin A. Edwards; Serial No. 505,469, filed October 8, 1943, for George M. Adams; and Serial No. 505,468, filed October 8, 1943, for John C. Aydelott and George M. Adams. The foregoing copending applications are assigned to the same assignee as the instant application. The inventions of said applications were made prior to the invention of our instant application and we do not herein claim anything shown or disclosed in said applications, which are to be regarded as prior art with respect to our present invention.

As pointed out in the above-identified copending applications, control current systems of the type outlined broadly in British Patent 226,960 are particularly applicable to certain types of vehicles which rely upon independent control of laterally spaced driving elements for propulsion, steering and braking. For a self-propelled vehicle, such a system may comprise a prime mover driving an electric generator, and a plurality of traction motors having their armatures connected in a loop circuit with the generator, the generator being regulated to supply a constant or otherwise continuously controlled unidirectional current to the motor armatures. For certain vehicles, such as twin screw or twin paddle boats, tractors, electric shovels, military tanks, and the like, which rely for maneuverability upon the independent control of laterally spaced driving elements, a controlled current system of the above type is particularly suitable. When the system is so applied, the excitation of the motor field windings is separately controlled independently to determine the torque and direction of rotation of each motor. For example, all motors in such a system may be quickly and easily reversed to effect dynamic braking merely by reversing the relatively small motor field currents, while the torque of all the motors upon either side of the vehicle may be reduced, or in fact reversed, without appreciably affecting the torque of the motors on the other side of the vehicle to effect steering operation.

The particular system of the British patent, however, while suitable for marine applications where rapid maneuverability is ordinarily not essential, is not in itself applicable to land vehicles because of its slow speed of response. A land vehicle, especially one such as a military tank which may be operated at high speed over irregular terrain and in close proximity to other vehicles, must possess not only maneuverability but also a very rapid speed of response. Furthermore, certain characteristic problems of land vehicle operation, such as overspeeding in running downhill, must be provided against by suitable protective means. Similar problems are also encountered in certain industrial operations where the load at times overhauls the motor.

Accordingly, it is a general object of our invention to provide a new and improved electric motor control system of great flexibility and which is reliable, easy to operate, and possessed of a very rapid speed of response.

It is a further object of our invention to provide an improved excitation system for dynamo-electric machines.

Still another object of our invention is the provision of new and improved means for exciting a dynamo-electric machine differentially in accordance with its armature current.

It is a still further object of our invention to provide, in a controlled circulating current system for a self-propelled electric vehicle having a prime mover, means for reducing the vehicle speed by generator field control with the prime mover speed at a minimum without reducing the available standstill torque below that determined by the prime mover speed alone.

Another object of our invention is the provision in a controlled circulating current electric power system, of new and improved means for limiting the circulating current and selecting the current limit value in accordance with motor speed.

It is a further object of our invention to provide, in a controlled circulating current system for a self-propelled electric vehicle, new and improved means for limiting the current to a selectable maximum value and for controlling the current limit value in accordance with steering demands of the vehicle.

Another object of our invention is the provision, in an electric motor control system for a self-propelled vehicle of the type steered by independent torque control of laterally spaced driving motors, new and improved means for limiting the motor current to a selectable maximum value and means for controlling the current limit value in accordance with vehicle speed and with the degree of steering demanded.

It is still another object of our invention to provide, in a gas- or Diesel-electric controlled current power system for a self-propelled vehicle, new and improved excitation means for the traction motors to render the motor armature current substantially constant over a wide range of vehicle speeds.

According to our invention, the above and other objects are attained by providing an electric power system comprising a prime mover, a generator, and one or more traction motors. The generator and motor armatures are connected in a loop circuit and means are provided for controlling the generator and motor excitations to maintain in the loop circuit a continuously controlled unidirectional current of definitely limited magnitude. If two or more motors are provided to drive laterally spaced driving elements of a track laying vehicle, the excitation of the motor field windings is separately and manually controllable independently to determine the torque and direction of rotation of the motors thereby to effect forward or reverse motoring, steering and electric braking operations without appreciably disturbing the continuously circulating armature current. In order to limit the speed of such a vehicle to a predetermined value, means are provided for automatically reversing the excitation of the motors to effect dynamic braking operation, if the vehicle speed tends to exceed such predetermined value. Severe steering is also facilitated by providing automatic means for temporarily raising the maximum current limit when the torque of the motors on only one side of the vehicle is reversed while forward torque is retained on the motors on the other side of the vehicle.

Preferably we drive the generator by means of an internal combustion engine having a substantially fixed maximum available horsepower output at any predetermined speed. The generator may be of the constant current type, although for more efficient utilization of the maximum available engine horsepower over a wide range of vehicle speeds it is preferable to utilize a generator having a voltage-current characteristic limited by maximum available engine horsepower in the region between maximum generator voltage, as determined by maximum field excitation, and maximum generator current, as determined by armature reaction or a suitable current limit circuit. Each traction motor is also provided with a separate engine-driven exciter having manually controllable excitation means to permit a continuous transition from maximum forward to maximum reverse motor excitation. For any predetermined setting of the manually adjustable motor field control means, the motor exciter fields and, hence, the motor field energization may be constant or may be connected to vary in accordance with motor current, or motor speed, or any desired combination of these.

Figure 1B:
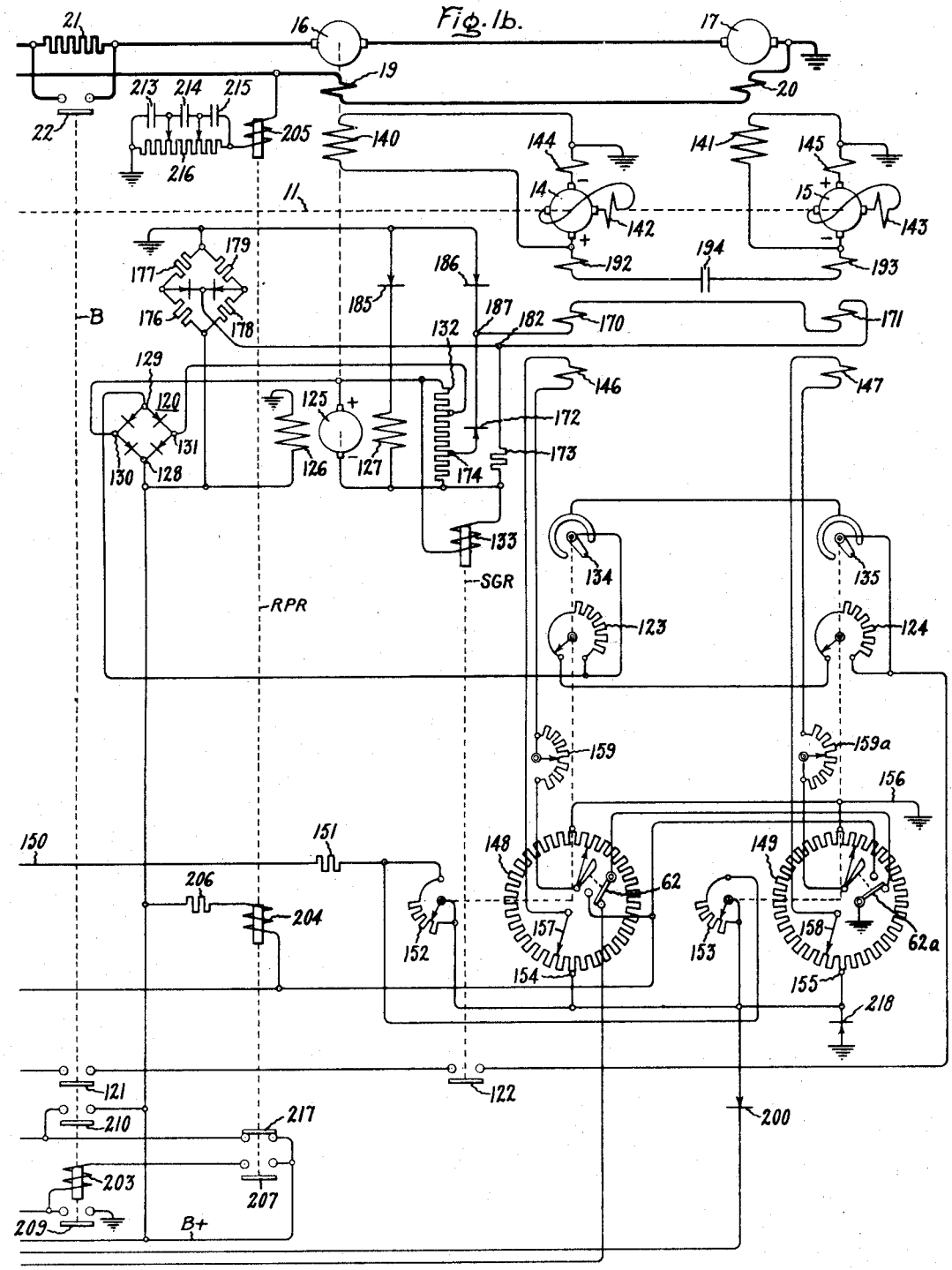
Figure 3:
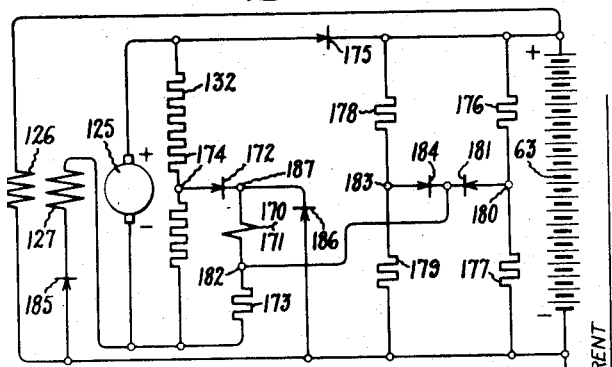
Figure 4:
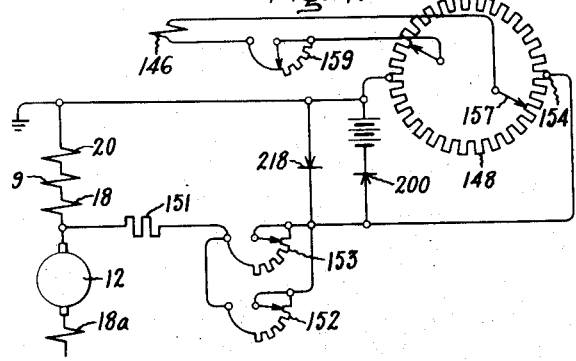

For a more complete understanding of our invention and a further appreciation of its objects and advantages, reference should now be had to the following detailed specification taken in conjunction with the accompanying drawings in which Fig. 1a and Fig. 1b taken together, constitute a schematic circuit diagram of connections for an electric power system embodying our invention; Fig. 2 is a simplified circuit diagram of the generator excitation circuits; Figs. 3 and 4 are simplified circuit diagrams of the motor excitation circuits; and Figs. 5 to 10, inclusive, are graphical representations of certain of the operating characteristics of our system.

Referring now to the drawings, and particularly to Figs. 1a and 1b which will be referred to hereinafter as Fig. 1, we have illustrated schematically therein a gas-electric power system for a self-propelled vehicle. The system comprises a prime mover 10 of the internal combustion engine type arranged to drive through a common shaft 11 a main generator 12, a generator exciter 13, and a plurality of electric traction motor exciters 14 and 15. An output circuit from the armature of the generator 12 is completed through the armatures of a pair of electric traction motors 16 and 17. The output circuit of the generator 12 is a series or loop circuit and includes differential series field and commutating pole windings 18a and 18, respectively, for the generator 12, commutating pole and pole face windings 19 and 20 for the motors 16 and 17, respectively, and a braking resistor 21 arranged to be shunted during motoring operation by a main contact 22 of a braking contactor B. The generator output circuit may be permanently closed as shown or, if desired, suitable disconnecting switches may be included. It will be understood, of course, that the representation of a pair of traction motors 16 and 17 is purely diagrammatic, and that each motor shown on the drawings may represent either a single motor or a group of motors arranged either in series or parallel circuit relation. For the purpose of illustration it will be assumed that each motor or motor group 16, 17 is arranged to drive the track on one side of a track laying vehicle, such as a tractor, military tank, or the like. For example, the motor 16 may drive the left-hand track, while the motor 17 drives the right-hand track.

*Engine control*

It is understood that in an internal combustion engine of the type herein contemplated the available horsepower output is a function of speed only. Thus, with the engine speed maintained substantially constant by a governor the available engine horsepower at full throttle is substantially fixed, while the actual delivered horsepower may be smaller as determined by load and throttle position. As shown on the drawings, the engine 10 is provided with a carburetor 25 having fixed idling jets and variable running jets. The running jets are supplied through a fuel inlet conduit 23 and controlled by a throttle valve lever 26. The idling jets are supplied through a separate fuel inlet conduit 23a provided with a shut-off valve 24 biased to an open position. The throttle lever 26 is biased by a tension spring 27 to an idling position with the throttle valve closed, and is connected through a rod 28 and an overtravel mechanism 29 to a speed controlled fluid motor 30. The fluid motor 30 is controlled by a speed responsive apparatus including an engine-driven tachometer generator 31 and a foot pedal 32. The foot pedal 32 controls the speed setting of the speed responsive apparatus, and that apparatus controls the fluid motor 30 to maintain substantially constant the speed of the engine 10 at the desired setting. The pedal 32 is biased by a tension spring 32a to a released position such that the governor is set for idling speed.

The fluid motor 30 comprises a power cylinder 30a having slidably mounted therein a driving piston 33 and connected by suitable inlet and outlet conduits to a control cylinder 30b having slidably mounted therein a control piston 34. The control piston 34 comprises three spaced rigidly interconnected valve elements 35, 36, 37 biased upwardly by a compression spring 34a and connected for downward actuation against the spring force by a solenoid 38 comprising a main actuating winding 39 and a stabilizing winding 40. The driving piston 33 is arranged to move longitudinally a gear rack 41 which meshes with a pinion 42 mounted upon a governor shaft 43. Suitable fluid under pressure, such as oil from the lubricating system (not shown) of the engine 10, is supplied to the fluid motor 30 through an inlet conduit 44 and is expelled from the motor 30 through an outlet conduit 45. The governor shaft 43 is arranged to drive through suitable gearing 46, 47, 48 a pair of potentiometers 49 and 50. The purpose of these potentiometers will be more fully described hereinafter. The shaft 43 also has rigidly mounted thereon an arm 51 which is resiliently connected, as by a tension spring 52, to a second arm 53 loosely mounted upon the shaft 43. The throttle rod 28 is connected to the loosely mounted arm 53. The arm 53, and hence, the engine throttle lever 26, is movable between predetermined limits fixed by an "idling" stop 54 and a "full throttle" stop 55. The arm 51, which is fixedly attached to the governor shaft 43, is not limited in its movement by the "full throttle" stop 55, and is thus capable of a certain degree of overtravel beyond the "full throttle" position of the shaft 43. During such overtravel, the spring 52 between the arms 51 and 53 is tensioned and the potentiometers 49 and 50 continue to move with the shaft 43. The potentiometer 49 is provided with a "dead" section over which it effects no change of potential of its slider 49a. The slider 49a operates over the dead section throughout the entire range of throttle controlling movement of the governor shaft 43, and over the live section of the potentiometer only during overtravel of the governor shaft 43 with respect to the throttle arm 53.

The principal control of the governor mechanism is through the engine tachometer generator 31 and the fluid motor control winding 39, the tachometer generator being connected to supply to the winding 39 a voltage proportional to the speed of the engine 10. The tachometer generator 31 has been shown as a three-phase magneto generator supplying current to a three-phase full wave rectifier 56 and from the rectifier 56 to the actuating winding 39 through a plurality of rheostats 57, 58, and 59 in series circuit relation. The rheostats 57 and 58 are manually adjustable to provide, respectively, a minimum running speed adjustment and an idling speed adjustment. The rheostat 59 is provided with a "dead" or constant resistance section 59a and is controlled by the foot pedal 32 selectably to determine the speed setting of the governing apparatus at the will of an operator. The pedal 32 must be depressed from its released position sufficiently far to move the slider of the rheostat 59 off the dead section 59a before the rheostat 59 becomes effective to control the governor setting. To provide a maximum speed adjustment a fourth rheostat 60 is connected in parallel circuit relation with the winding 39 and the rheostats 57 and 58. A condenser 61 is connected in parallel circuit relation with the rheostats 57, 58 and 59 for the purpose of controlling the energization of the actuating winding 39 in response to the rates of change of engine speed and foot pedal position. The condenser 61 delays the effect of change in foot pedal position upon the governor solenoid 38 and increases the rapidity with which the solenoid 38 responds to changes in engine speed. The rheostat 57 determines minimum running speed and is arranged to be shunted by the normally closed contacts of a pair of "dead man" switches 62 and 62a in series circuit relation. These switches are mounted upon the operator's steering handles and will be more fully described hereinafter. For the present, it will be sufficient to understand that when the vehicle is at standstill with the engine running the rheostat 57 is short-circuited, but that as soon as circuits are completed to provide field excitation for the generator and the motors the minimum running speed control rheostat 57 is unshunted by the switches 62 and 62a. Thus, the rheostat 58 controls the engine idling speed and the rheostat 57 controls the minimum running speed. The purpose of such minimum running engine speed is to provide adequate power for braking and steering even though the pedal 32 is in its released position.

The stabilizing winding 40, operating in conjunction with the actuating winding 39 to control the fluid motor 30, is connected between one terminal and the sliding contact of the potentiometer 50 controlled by the governor shaft 43. This potentiometer 50 is connected at one terminal to ground and at the other terminal to the positive side of a suitable source of unidirectional current supply, such as a battery 63. The battery 63 is connected through a suitable disconnecting switch 64 and fuse 65 to a wire B+, and the potentiometer 50 is connected to the wire B+ through a manually operable control switch 66. A condenser 67 in the circuit of the stabilizing winding 40 renders the winding 40 responsive only to changes in the setting of the potentiometer 50 produced by movements of the fluid motor 30. The stabilizing winding 40 is so arranged that it transiently opposes any movement of the fluid motor control piston 34 in response to change in the energization of the actuating winding 39. The winding 40, thus, minimizes hunting of the governor.

The stabilizing winding 40 is shunted by a non-linear unilateral conducting device, such as rectifier 68. The breakdown voltage of the rectifier 68 in its conducting direction is such that it does not provide appreciable shunting of the winding 40 for normal stabilizing currents in either direction. However, in the event that the engine load is dropped very suddenly, as due to a break in the line circuit, a very large transient current would tend to pass through the winding 40 in a direction to oppose the rapidly increasing flux of the winding 39. The winding 39 is now attempting to reduce engine speed. It is of course desirable to so reduce the engine speed as rapidly as possible under such conditions, and hence desirable to do away with the opposing tendency of the winding 40. The rectifier 68 thus functions upon very rapid overspeeding of the engine to shunt the winding 40 and to eliminate its normal stabilizing effect.

To provide for starting and stopping the internal combustion engine 10, we provide a pair of manually operable push buttons 70 and 71 and an engine starting motor 69 connected to the engine shaft 11 to drive the engine. The push button 71 is for engine starting and comprises two normally open contacts 72 and 73. When the starting button 71 is depressed, the contact 72 completes an energizing circuit for an actuating winding 74 of a starting contactor 75. This energizing circuit may be traced from the wire B+ through the manual switch 66, the contact 72, and the actuating winding 74 to ground. When the starting contactor 75 picks up, it closes its contact 76 to complete an energizing circuit from the wire B+ through the engine starting motor 69.

During this starting operation, the starting switch 71 also closes its contact 73 to connect the stabilizing winding 40 of the governor momentarily directly across the battery. It will be noted that with the engine at stand-still the engine lubricating oil in the conduit 44 is under zero pressure, the control piston 34 is held at the upper limit of its movement by the spring 34a, and the throttle lever 26, governor shaft 43 and driving piston 33 are held in their idling positions by the spring 27. Momentary energization of the winding 40 from the battery during engine cranking forces the control piston 34 of the fluid motor 30 downward against the bias of the spring 34a thereby to ensure that the driving piston 33 and the throttle control mechanism connected thereto remain in their idling positions. Were it not for this downward actuation of the control piston 34, the pressure built up in the lubricating oil system by engine cranking would supply oil under pressure between the control piston valves 36 and 37 and to the right side of the driving piston 33 thereby to move the driving piston 33 to its extreme left-hand position and the throttle lever 26 to its full open position. It is undesirable to attempt to start the engine with the throttle fully open, and in fact many engines will not start with the throttle so positioned. It is to prevent such opening of the throttle before the engine 10 fires that the stabilizing coil 40 is momentarily energized from the battery. When the control piston 34 is moved to its lowermost position by the coil 40, any oil under pressure is supplied to the left side of the driving piston 33 and holds the throttle control mechanism in idling position.

The engine stop switch 70 comprises two normally open contacts 77 and 78 and is arranged, when depressed, to complete, through the contact 77, a circuit from the wire B+ through an actuating winding 79 of a fuel cut-off solenoid 80. As indicated on the drawings, the solenoid 80 is arranged when energized to close the fuel cut-off valve 24 in the engine fuel conduit 23a. The other normally open contact 78 on the engine stop switch 70 is arranged to connect the governor stabilizing winding 40 directly across the battery in the same manner as the contact 73 of the engine starting switch 71. The reason for energizing the winding 40 from the engine stop switch 70 is to ensure that the control piston 34 of the fluid motor 30 will be moved to its lowermost position thereby to move the driving piston 33 to its idling position as the engine is brought to standstill. Thus the contact 77 of the stop switch 70 controls the shut-off valve 80 to cut off fuel from the idling jets of the carburetor 25, while the contact 78 controls the governor 30 to move the throttle lever 26 to its idling position thereby to close the running jets. With the engine at standstill, of course, the throttle lever 26, the governor arms 51 and 53, the governor shaft 43, and the driving piston 33 are all biased to their idling positions by the throttle spring 27, and the control piston 34 of the fluid motor 30 is biased to its uppermost position by the compression spring 34a. Since, with the engine at standstill, the lubricating oil pressure is zero, the driving piston 33 is not moved to the left even though the oil inlet conduit is opened for such movement.

The engine 10 is provided also with an overspeed switch 81 actuated by a suitable speed responsive mechanism 82. The switch 81 comprises a normally open contact 84 which is connected in parallel circuit relation with the engine stop switch contact 78. Thus, when a predetermined maximum engine speed is exceeded, the overspeed contact 84 momentarily connects the governor stabilizing winding 40 across the battery 63 for the purpose hereinbefore described in connection with the stop switch 70. It will be understood that in operation the overspeed switch 81 regulates or operates intermittently to energize the governor coil 40, thereby to maintain an average maximum speed determined by the overspeed switch setting and to prevent engine "run away" in case of governor failure.

The various parts of the governor mechanism are shown at Fig. 1 in their normal positions with the engine at standstill. The manner in which the engine is cranked and the control piston 34 of the fluid motor 30 simultaneously and momentarily forced to its lowermost position has already been described. As soon as the engine fires, the starting switch 71 is released. Steady state energization of the stabilizing winding 40 from the battery is discontinued by opening of the switch 71, and the control piston moves back from its lowermost position to an equilibrium position. This position of equilibrium is that in which the force of the spring 34a is just balanced by the opposing force of the main governor actuating winding 39. The force exerted by the winding 39 is dependent upon the engine speed, and the engine speed will now assume a value such that the opposing forces of coil 39 and spring 34a are balanced when the control piston valve 36 is centrally positioned with respect to the oil inlet conduit 44. In this mid-position of the control piston 34, oil under pressure is supplied in equal quantity to both sides of the driving piston 33. Both pistons are thus hydraulically balanced.

It will now be evident that the fluid motor 30 will regulate to maintain the engine speed at the desired point. For example, if the engine speed increases for any reason, the energization of the governor actuating winding 39 will be increased and the control piston 34 will be moved downward. Downward movement of the piston 34 closes the fluid connection from the inlet conduit 44 to the right-hand side of the driving piston 33 and increases the flow of oil from the conduit 44 to the left side of piston 33 thereby to move the piston 33 to the right and the engine throttle lever 26 toward its idling position. In moving downward the valve 37 of the control piston 34 uncovers the associated exhaust port to permit exhaust of oil from the right side of piston 33 to the exhaust conduit 45. If, on the other hand, the engine speed decreases below its desired value for any reason, the energization of the governor winding 39 will decrease so that the spring 34a will move the control piston 34 upward. When the piston 34 moves upward the valve 36 closes the fluid connection from the inlet conduit 44 to the left side of piston 33 and admits more oil to the right side of the piston, thereby to move the piston 33 to the left. Simultaneously the valve 35 uncovers the associated exhaust port to admit oil from the left end of piston 33 to the exhaust conduit 45. Movement of the driving piston 33 toward the left moves the engine throttle lever 26 toward its full open throttle position thereby to increase the engine speed.

The constant engine speed maintained by the governor mechanism is controlled by the rheostats 57, 58, 59, and 60. The rheostats 57 and 58 are set manually to determine the amount of resistance in series with the governor coil 39 with the pedal 32 in its released position. The pedal controlled rheostat 59 is also connected in series circuit relation with the winding 39 and permits selection of the engine speed by the pedal 32 at the will of the operator. The idling position of the pedal 32 determined by the spring 32a is such that the rheostat 59 inserts its minimum resistance in the circuit of the winding 39. As the pedal 32 is depressed, the rheostat 59 inserts more resistance in series with the winding 39. Since the current in the winding 39 must be the same at any speed maintained in order that the control piston 34 will be balanced, the engine speed, and hence the voltage of the tachometer generator 31, increases as the pedal is depressed. The rheostat 60 is set manually to determine the engine speed at the maximum speed position of the rheostat 59. This rheostat 60, being connected across the tachometer in parallel circuit relation with the winding 39 and the rheostats 57 and 58, determines the proportion of current passing through the winding, and hence may be set to require various engine speeds to pass the necessary fixed current through the winding at the maximum resistance position of the rheostat 59.

The purpose of the overtravel linkage 29 will now be evident. If the load upon the engine is so great that even after the governor has moved the throttle to its full open position the engine is still unable to maintain the desired speed, the governor through the overtravel linkage 29 connected to the governor shaft 43, will move the slider of the potentiometer 49 over the live section of the potentiometer without effecting further movement of the engine throttle. Movement of the potentiometer slider 49a in overtravel over the live section of the potentiometer reduces the excitation of the generator exciter 13 and hence the generator 12 in a manner which will be described hereinafter. Such reduction of the generator excitation reduces the load upon the engine and permits the engine to attain the desired speed. By this arrangement, the power demand of the engine driven generator 12 is reduced in the middle range of its volt-ampere characteristic where it would otherwise exceed the maximum available horsepower output of the engine 10, thereby to prevent engine stalling within this range and to permit maximum utilization of full available engine horsepower over a wide range of vehicle speeds and generator load currents.

The engine control described above by way of illustration is further described and particularly claimed in a copending application of Martin A. Edwards, Serial No. 505,437, filed October 8, 1943, and assigned to the same assignee as the instant application.

*Generator field excitation*

The main engine driven generator 12 is provided with a main field exciting winding 90 connected directly to the terminals of the dynamo-electric exciter 13 and so controlled as to provide in the output circuit of the generator 12 a continuing unidirectional flow of current having a controlled maximum or limiting value substantially independent of the back electromotive force of the traction motors 16 and 17. The volt-ampere characteristic of the generator 12 at any predetermined engine speed is dependent upon the energization of the main generator field exciting winding 90 which is, in turn, controlled by the energization of a plurality of field windings 91, 92, 93, and 94 on the exciter 13.

Preferably, the exciter 13 is a direct current generator of the type described and claimed in Patent 2,227,992, issued to Ernst F. W. Alexanderson and Martin A. Edwards on January 7, 1941. Such a generator is of the cross armature reaction excited direct armature reaction compensated type known as an amplidyne, and is provided with a pair of current supply brushes 95 and a pair of short-circuited brushes 96. The control field windings 93 and 94 are arranged to generate a voltage between the short-circuited brushes 96, and the cross armature reaction of the current flowing through the short-circuited connection as a result of this voltage sets up a flux in such a direction as to provide an output voltage at the load brushes 95 which is proportional to the excitation of the machine along its short-circuit axis. The field winding 92 is a series load compensating winding for neutralizing the armature reaction of the exciter load current. The exciter 13 may also be provided with a cross-axis series field winding 98 which serves to increase the cross-axis excitation without increasing the short-circuit current. One of the desirable characteristics of an amplidyne generator of this type is that its output voltage responds very rapidly and with a high degree of amplification to any change in the energization of its control field windings.

Referring now more particularly to the control field windings 93 and 94 of the generator exciter 13, it may first be noted that the main control field winding is the winding 94. The winding 93 is used only for line current limit operation and is arranged, when energized, to oppose the flux of the main control field winding 94. The energizing circuit for the main generator exciter control field winding 94 may be followed more easily by referring now to Fig. 2. Fig. 2 is merely a simplified circuit diagram of the generator excitation circuit shown at Fig. 1, and like parts have been assigned the same reference numerals. From Fig. 2, it will be observed that the governor controlled potentiometer 49 is connected to the positive terminal of the battery 63 through a resistor 99 and to ground through a resistor 100 and either or both of the "dead man" switches 62 and 62a if either or both of these switches be moved to close the normally open contacts. The main generator exciter control field winding 94 is connected between the slider 49a of the potentiometer 49 and ground through a series resistor 101 and the switches 62 and 62a. An additional resistor 102 is connected between the slider and the positive terminal of the battery merely for the purpose of providing energization for the main control field winding 94 in the event that the slider of the potentiometer 49 is damaged. It will be recalled that the potentiometer 49 effects no change in potential of the slider 49a between the idling position and the full open throttle position of the governor mechanism. Thus, so long as the governor is not in its overtravel range, the battery 63 tends to maintain constant the excitation of the main generator exciter control field winding 94. As the governor mechanism goes into overtravel with the throttle fully open, the potentiometer 49 reduces the battery excitation of the generator exciter control field winding 94 as it traverses its live section.

The generator exciter control field winding 94 is energized not only from the battery 63, but also differentially in accordance with the magnitude of current in the generator output circuit. This current responsive energizing circuit is so arranged that it is ineffective to modify the battery excitation of the control field winding 94 until the main line current has attained a predetermined minimum value. For currents of this predetermined value and above, the energization of the control field winding 94 is reduced directly in accordance with the value of the line current. For the purpose of so controlling the energization of the control field winding 94, we provide between the positive terminal of the main generator 12 and ground a voltage divider comprising three resistors 103, 104, and 105. The voltage appearing across these three resistors in series is the same as that appearing across the main machine commutating windings 18, 19, and 20 and is thus proportional to the magnitude of the main line current. A point 106 between the resistors 103 and 104 is connected through a rectifier 107 and a resistor 108 to a point 109 between the control field winding 94 and resistor 101.

To understand the effect of the current responsive differential excitation of the generator exciter control field winding 94, reference should now be had to Fig. 5. Fig. 5 is a more or less conventional diagrammatic representation of the power output characteristics of a Diesel electric system. In such a system, the main generator 12, if driven at maximum speed, will exhibit an inherent full load volt-ampere characteristic of the general shape of the curve A of Fig. 5, while the available power output of the engine 10 will be substantially fixed, as indicated by curve B. Ordinarily, the capacities of the various elements of the system are so selected that these curves intersect in the central operating range in order to attain maximum utilization of the available engine power over the widest possible range of vehicle speeds. From the curves A and B it will be evident that, within the central portion of the operating range, the generator is demanding more power than the engine is capable of supplying, and that the only way that the power output curves may be caused to coincide, as they must, is for the power output of the generator to be slightly diminished by engine stalling within this range. Since such reduction in the engine speed also reduces the available power output of the engine, it is preferable to reduce the generator demand so that it just equals the available engine output at full speed. In the present system, such reduction of generator demand is effected by reducing the generator excitation by means of the governor operated potentiometer 49 previously described. By way of example, let it be assumed that the curve A of Fig. 5 has been drawn for the full open position of the engine throttle. With the throttle in this position, potentiometer 49 has effected no change in the battery potential supplied to the generator exciter field 94. However, as previously explained, the governor is provided with a certain degree of overtravel so that if, with the throttle in the full open position, the engine speed tends to fall below governed speed, the arm 51 attached to the governor shaft 43 moves the slider 49a over the live section of the potentiometer 49 to effect a reduction in the energization of the generator exciter field winding 94 without further opening the engine throttle. By thus reducing the excitation of the generator 12, the power demand of the generator is reduced to a point where it just equals the available power output of the engine. This action is of a regulatory nature, and results in bringing the generator volt-ampere characteristic into coincidence with the available power output of the engine over the constant power range C of the resultant generator volt-ampere characteristic shown in solid lines at Fig. 5. It will be understood that in the region D the maximum voltage of the generator is determined by maximum battery energization of the field winding 94. The portion E of the curve of Fig. 5 is determined by a differential generator excitation characteristic to be described hereinafter and by internal generator characteristics. The portion F of the generator volt-ampere characteristic represents the pure resistance drop through the armatures of the traction motors and shows the manner in which the line current builds up in proportion to generator voltage with the vehicle at standstill.

Referring now again to Fig. 2, a rectifier 107 and its point of connection to the voltage divider 103, 104, 105 are preferably so selected that the rectifier 107 remains non-conducting until the line current attains a value $I_1$ at Fig. 5 where the generator demand (see curve A Fig. 5) first tends to exceed the maximum available engine power (see curve B Fig. 5). For line currents above this value, the potential of the point 106 is such, and the rectifier 107 is so disposed, that the rectifier becomes conducting to pass current from the point 106 through the resistors 108 and 101 to ground. This spill-over current raises the potential of the point 109 on the low potential side of the generator control field winding in proportion to the magnitude of the main line current, so that the net excitation of the control field winding 94 for currents above the current $I_1$ diminishes in direct proportion to the increase in main line current. This characteristic is shown at Fig. 6, where the curve G represents the total energization of the generator exciter control field winding 94 plotted against the generator armature current. It will of course be understood that if desired the rectifier 107 may be connected to the voltage divider to become effective at line currents above or below the current $I_1$ chosen for purpose of illustration.

In order to permit continued operation of the vehicle at very low speeds, several steps of excitation of the generator exciter control field winding 94 are provided under control of the pedal 32 shown at Fig. 1. It will be observed, from this figure, that the pedal 32 is connected through an overtravel linkage 110a to control a contactor 110 having three normally closed contacts 111, 112, and 113 which open sequentially in the order named as the pedal 32 is depressed. The overtravel linkage 110a is similar to the linkage 29, and permits the contactor 110 to move with the pedal 32 as the pedal moves the rheostat 59 over its dead section 59a. The contacts 111, 112, and 113 are all opened during this initial pedal movement and the overtravel linkage 110a holds the contactor 110 open as the pedal is further depressed to move the slider of the rheostat 59 over the live or active section of the rheostat. Thus, as the pedal 32 is depressed from its fully released position, it first opens the contacts 111, 112, and 113 sequentially without affecting engine speed, and thereafter increases engine speed through the rheostat 59 while holding the contacts 111, 112, and 113 open. At Fig. 2, it may now be observed that the contact 113 connects a point 114 between the rectifier 107 and resistor 108 to the positive terminal of the battery 63 through a resistor 115. Also, the switch 112 connects a point 116 between the resistors 104 and 105 to the slider 49a of the potentiometer 49 through a pair of serially connected resistors 117 and 118. The resistor 117 is normally short-circuited by the contact 111.

The operation of the pedal controlled contactor 110 may now be understood by assuming that the vehicle is running at maximum speed with the pedal 32 depressed and the throttle fully open. If now the pedal 32 is gradually raised, the engine speed is first reduced to the minimum running speed with the switches 111, 112 and 113 remaining open. Subsequently, with the engine remaining at minimum speed, the switches 113, 112 and 111 are closed sequentially in the order named. Closure of the switch 113 raises the potential of the point 114 at Fig. 2 by connecting it through the resistor 115 to the positive terminal of the battery. This has the same effect as if the potential of the point 114 had been raised by high line current through the action of the rectifier 107, so that the energization of the control field winding 94 is limited even though the line current has not attained a value sufficient to bring the point 114 to the potential determined by its connection to the battery 63 through the resistor 115. Until the line current does attain such a value, the excitation of the control field winding 94 remains constant, as shown by the curve H of Fig. 6. Preferably, the resistor 115 is so chosen that the potential of the point 114 with the switch 113 closed is equal to the potential which it would attain through the rectifier 107 as the vehicle starts from standstill with the engine operating at its minimum running speed. Thus, curve H of Fig. 6 crosses the curve G at a point J where the line current has a predetermined value I₂. For any line current above the value I₂, the potential of the point 114 is controlled by line current causing spill-over through the rectifier 107, so that the energization of the control field winding 94 is reduced below the constant portion of the curve H of Fig. 6. It will of course be understood that by suitable selection of the resistor 115 the curve H may be caused to meet the curve G at some current below the normal standstill value.

Two further steps of diminished generator excitation are provided as the pedal 32 is further released. Upon such further release, the second accelerating switch 112 is closed to connect the point 116 on the voltage divider 103, 104, 105 to the slider of the potentiometer 49 through the resistors 117 and 118. The point 116 on the voltage divider is preferably so chosen that its potential is equal to the potential of the slider of the potentiometer 49 when the line current has the value I₂ and the vehicle is starting from standstill with the engine speed at its minimum running value. For a lesser line current, the potential of the point 116 is lower and decreases the potential of the potentiometer slider and therefore of the high potential terminal of the control field winding 94. Thus, as the line current is reduced below the value I₂, the energization of the winding 94 is progressively decreased by decreasing the potential of its higher potential terminal. This action results in a curve K of Fig. 6. An additional step of energization, such as indicated by a curve L of Fig. 6, is attained by closing the accelerating switch 111 as the pedal 32 is further raised, thereby to decrease the resistance between the point 116 and the higher potential terminal of the control field winding 94. It will of course be understood that the point 116 may be so chosen that the line L will intersect the line G at some line current less than standstill value.

Fig. 7 shows the net excitation of the generator 12 resulting from the exciter characteristic of Fig. 6 expressed in the field winding 90 combined with the effect of the differential series field winding 18a.

It will be evident that, if desired, one or more of the above described steps of reduced generator excitation may be omitted, or that additional steps may be added if deemed necessary. For example, apparatus of the character here described has been successfully operated with the switch 113 and resistor 115 omitted. Such omission eliminates the knees at J in the curves K and L of Fig. 6, because the point 109 is no longer tied to the battery 63 through the switch 113. On the other hand, without the tie to the battery through the switch 113, the potential of the point 114 will not remain constant for all currents below I₂, but will be gradually raised through the rectifier 107 for all currents above I₁, thereby to decrease the generator excitation. This effect will produce knees in the curves K and L of Fig. 6 below the current value I₁. Accordingly, the point 116 on the voltage divider 103, 104, 105 must be so selected that the joint effect of the switch 112 and rectifier 107 causes the curve K to pass through the point J. Such a characteristic is illustrated by the curve K₁ of Fig. 6.

It may now be observed that by control of the contactor 110 as the pedal 32 overtravels beyond the minimum engine speed position to its fully released position we have provided, in effect, a plurality of steps of electrical low gear for the vehicle. While it is possible to obtain low vehicle speeds by inserting series resistance in the generator field circuit as the pedal is released, our present arrangement is preferable because it allows the line current to rise to its maximum value at minimum engine speed regardless of pedal position. Since the line current alone determines motor torque, it is evident that the available standstill torque at minimum engine speed is not reduced by the present reduced speed running arrangement. This feature is of considerable advantage in preventing stalling of the vehicle when it encounters obstacles at reduced speeds.

*Line current limit*

For the purpose of limiting the current in the generator output circuit to a desired maximum value, means are provided for abruptly energizing the exciter differential control field winding 93 when the line current attains such maximum value. The current limit circuit may be more readily understood from the simplified diagram of Fig. 2. From this figure, it will be observed that the current limit winding 93 is connected across the main machine commutating windings 18, 19, and 20 in series circuit relation with the battery 63 and a rectifier bridge 120. The battery 63 is connected in opposition to the voltage drop across the commutating windings, 18, 19, and 20, and the rectifier bridge 120 is so disposed that it will not conduct current from the battery through the field winding 93, but will become conducting only when the voltage of the positive terminal of the generator 12 exceeds the positive battery voltage. This spill-over circuit may be traced at Fig. 2 from the positive terminal of the generator 12 through the current limit control field winding 93, an interlock contact 121 upon the braking contactor B, an interlock contact 122 upon a relay SGR to be described more fully hereinafter, a pair of serially connected rheostats 123 and 124, and finally through the rectifier bridge 120 to the positive terminal of the battery 63.

The switches 134 and 135 are open and the rheostats 123 and 124, short-circuited by their sliders in normal straightforward motoring operation. These rheostats insert no resistance in the current limit circuit so long as forward motoring torque is being applied to both traction motors. It will thus be evident that, when the current flowing in the output circuit of the generator 12 attains such a value that the voltage drop across the commutating pole windings 18, 19, and 20 is greater than the voltage of the battery 63 by an amount sufficient to break down the rectifiers in the arms of the rectifier bridge 120, current will spill over from the positive terminal of the generator 12 through the control field winding 93 and the battery. The resistance of this spill-over path is very low, and therefore a high energizing current traverses the differential winding 93 in a direction to reduce the excitation of the generator exciter 13. The current in the main generator output circuit is thus decreased until spill-over through the winding 93 ceases. This action is regulatory and serves to limit the main line current to the selected maximum value.

It is desirable to reduce the maximum current limit as the vehicle speed increases. That is, the current limit circuit should be brought into operation at a somewhat lower line current when the vehicle speed is high than when the vehicle speed is low. This condition is imposed by the limit of good commutation by the traction motors 16 and 17. For this purpose, we provide a tachometer generator 125 having a separately excited field winding 126 energized directly from the battery 63 through the wire B+. The tachometer generator 125 is driven from the shaft of one of the traction motors, for example, the traction motor 16, and thus supplies an output voltage substantially proportional to vehicle speed for modifying the operation of the current limit circuit. The output voltage of the tachometer generator 125 is slightly modified at high vehicle speeds by the operation of a self-excited field winding 127. Except at high speeds, however, the winding 127 is ineffective, as will be more fully described hereinafter, and for the purpose of current limit operation the output voltage of the tachometer generator 125 may be regarded as essentially proportional to vehicle speed.

Figure 8:
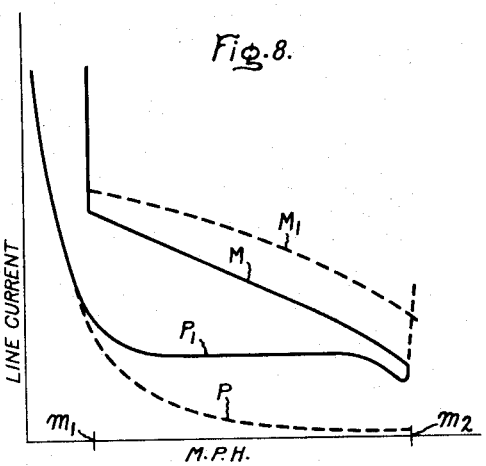

Referring now again to Fig. 2, it will be noted that the rectifier bridge 120 is connected through one pair of diagonally opposite points 128, 129 in the spill-over circuit through the current limit field winding 93. The other pair of diagonally opposite points 130, 131 of the rectifier bridge 120 is connected to spaced points on a voltage divider 132 connected across the terminals of the tachometer generator 125. Due to the rectifying action of the bridge 120, the speed voltage across the terminals 130, 131 of the bridge may be regarded as appearing permanently between the terminals 128 and 129 regardless of the direction of motion of the vehicle, the terminal 128 being positive with respect to the terminal 129. From Fig. 2, it may also be observed that, in the series circuit through the current limit control field winding 93, the potential superposed upon the circuit by the tachometer generator 125 through the rectifying bridge 120 opposes the voltage of the battery 63. Thus, for current limit operation, the total voltage available for opposing the battery voltage to effect spill-over of current through the control field winding 93 is increased in proportion to the speed of the vehicle by the voltage between the terminals 130 and 131 of the rectifier bridge. Since the battery voltage is substantially constant, it will be clear that as the vehicle speed increases spill-over through the battery, and hence current limit operation, will take place with progressively smaller voltage drops across the commutating pole windings 18, 19, and 20, that is, at reduced main line currents. In this way, the maximum current limit is reduced as the vehicle speed increases. This action is indicated at Fig. 8, where a curve M represents the normal current limit value at various vehicle speeds.

From Fig. 2, it will be observed that the current limit is removed at a predetermined low vehicle speed. This is accomplished by the relay SGR of Fig. 1 through the interlock contact 122 shown at Fig. 2. From Fig. 1, it will be observed that the relay SGR is provided with an actuating winding 133 connected directly across the output terminals of the tachometer generator 125. The relay SGR is arranged to pick up and close its contact 121 at a predetermined minimum vehicle speed, such as $m_1$ at Fig. 8. Closure of the contact 121 brings the current limit circuit into operation. Removal of the current limit control at low vehicle speeds permits the use of a reasonable low current limit at higher vehicle speeds without limiting the tractive effort at standstill.

The foregoing explanation of the current limit circuit has been described assuming that the rheostats 123 and 124 are short circuited by their sliders during normal straight forward motoring operation to connect the terminal 129 of the rectifier bridge 120 directly to the generator exciter control field winding 93 through the contacts 121 and 122. It may now be noted that these rheostats 123 and 124 are arranged to be short circuited also by a pair of serially connected switches 134 and 135. Both switches 134 and 135 must be closed to short circuit the rheostats 123 and 124. The switches 134 and 135 and the rheostats 123 and 124 are controlled by steering apparatus to be more fully described hereinafter. These switches and rheostats serve to control the current limit for severe steering operation. This modification of the current limit by steering will be more readily understood after the steering operation itself has been described.

The current limit circuit is disabled during dynamic braking operation by the contact 121 of the braking contactor 13. The purpose of so removing the current limit during braking will be more fully described herein below.

Traction motor field control

Referring now to the field control for the traction motors 16 and 17, it may first be noted that each motor is provided with a main separately excited field winding, the motor 16 having a winding 140 connected to the output terminals of the dynamoelectric exciter 14 and the motor 17 having a field winding 141 connected to the output terminals of the dynamoelectric exciter 15. Preferably, the exciters 14 and 15 are amplidyne generators of the type heretofore described in connection with the generator exciter 13 and comprise cross-axis series field windings 142, 143 and series load compensating windings 144 and 145, respectively. The exciters 14 and 15 are also provided with main control field windings 146 and 147, respectively, which are energized through manually controllable potentiometer bridges 148 and 149, respectively, in accordance with the voltage drop across the commutating pole windings 18, 19, and 20 of the main generator output circuit. The energizing circuit for the windings 146 and 147 may be traced from the positive terminal of the engine driven generator 12 through a wire 150, a resistor 151, and in parallel through a pair of rheostats 152 and 153 to the points 154 and 155 on the potentiometer bridges 148 and 149, respectively, and hence through both sides of both potentiometers in parallel circuit relation to a grounded wire 156. Thus, the voltage appearing across each potentiometer 148 and 149 between the points 154 and 155 to ground is proportional to the current in the generator output circuit, as indicated by the voltage drop across the commutating pole windings 18, 19, and 20. Suitable voltages for application to the motor exciter field windings 146 and 147 are selected on the potentiometers 148 and 149 by means of manually positionable steering handles 157 and 158, respectively, and applied to the windings through series rheostats 159 and 159a, respectively. The rheostats 159 and 159a are separately and manually adjustable so that the standards of excitation of the motor exciter main control field windings 146 and 147 may be set at suitable values and balanced. Adjustment of these rheostats is effected principally so that the vehicle will run forward without turning when the steering handles are left in their forward positions.

It is desirable at this point to note certain mechanical features of the steering handles 157 and 158. Primarily, these handles have for their purpose the determination of the standard of energization of the motor field windings 140 and 141 by selection from the potentiometers 148 and 149 of suitable voltages proportional to line current for application to the motor exciter field windings 146 and 147. It will also be noted that each steering handle is provided with a "dead man" interlock switch having a pair of normally closed contacts and a pair of normally open contacts. The "dead man" switch 62 is mounted upon the handle 157 and the switch 62a is mounted upon the handle 158. These dead man switches are actuated by handle levers attached to the steering handles, and are arranged to be closed as soon as the handles are grasped by an operator. The normally open and normally closed contacts of the switches are interconnected so that if any one or both of the switches are closed the resistors 100 and 101 will be connected to ground. Preferably, as indicated at Fig. 1, the steering handles 157 and 158 are biased to a normal position such that substantially full forward voltage is applied to the control field windings 146 and 147.

The steering handles are also arranged to operate a number of auxiliary switches and rheostats. For example, the rheostats 152 and 153 are arranged to be fully in circuit when the steering handles 157 and 158 are in their normal positions and are connected for operation, respectively, to the handles 157 and 158 for movement therewith to cut out resistance as the handles are drawn back toward the null points of the potentiometer bridges. The rheostats 152 and 153 are arranged to be fully cut out when the steering handles reach the null points. The purpose of these rheostats will be more fully described hereinafter in connection with steering operation. In addition to the rheostats 152 and 153, the steering handles 157 and 158 are also connected to actuate the rheostats 123 and 124 and the switches 134 and 135, respectively. The rheostats 123 and 124 and the switches 134 and 135 are in the current limit circuit to provide steering control of the current limit, as will be explained hereinafter, but for the present it will be sufficient to note that the sliders of the rheostats 123 and 124 are normally at their minimum resistance positions. Furthermore, the forward halves of these rheostats are "dead" so that the rheostats effect no change of resistance so long as the steering handles are forward at their null points. These rheostats become effective to insert resistance in the current limit circuit as the steering handles are moved beyond their null points and into their reverse quadrants. The switches 134 and 135 are both normally open, but are each closed as soon as the connected steering handle is moved a predetermined small distance toward the null point from its normal biased position.

It will be clear from the above description of the potentiometers 148 and 149 that, with the steering handles 157 and 158 set in any predetermined position, the energization of the main control field windings 146 and 147 of the motor exciters 14 and 15 will vary in accordance with the magnitude of the main line current. Furthermore, since the exciters 14 and 15 serve as dynamo-electric amplifiers, it will be understood that the energization of the motor field windings 140 and 141 is proportional to the armature current of the motors so that, except as modified under certain conditions explained hereinafter, the excitation characteristic of the traction motors 16 and 17 is similar to that of a series motor. It will be understood that the steering handles 157 and 158 are independently and manually controllable, so that the standard of excitation of each motor may be selected independently and set at any point between full forward field and full reverse field. The energizing circuit for the motor exciter windings 146 and 147 is shown in simplified form in Fig. 4. While Fig. 4 shows only a single potentiometer bridge 148, it will be understood that the potentiometer bridges 148 and 149 are connected in parallel circuit relation as shown at Fig. 1.

The series excitation characteristic of the traction motors 16 and 17 is desirable because it increases the speed up to which maximum utilization of available engine horsepower may be obtained. However, it has been found that even higher motor speeds than may be thus attained are desirable at the point of maximum utilization of engine horsepower. This arises, in part, from the fact that saturation of the motor fields at low vehicle speeds in an effort to obtain maximum tractive effort for starting impairs to some extent the proportionality between line current and the motor flux. Accordingly, in order further to increase the motor speed up to which maximum utilization of engine horsepower may be obtained, we provide additional means for exaggerating the series excitation characteristic of the motors by controlling the motor excitation in approximately inverse proportion to vehicle speed, as well as in direct proportion to the main line current. For this purpose, we utilize the voltage of the tachometer generator 125 to energize, substantially in proportion to vehicle speed, a pair of differential control field windings 170 and 171 on the motor exciters 14 and 15, respectively. Referring now to Figs. 1 and 3, it will be observed that the control field windings 170 and 171 are connected in series relation with each other and with a rectifier 172 and a resistor 173 across a portion of the voltage divider 132 at the output terminals of the tachometer generator 125. This series circuit through the control field windings 170 and 171 is connected from an intermediate point 174 on the voltage divided 132 to the negative terminal of the tachometer generator 125, and the rectifier 172 is disposed to conduct current through the windings 170 and 171 only when the point 174 is more positive than the negative terminal of the tachometer generator. The positive terminal of the tachometer generator 125 is connected through a rectifier 175 in the rectifier bridge 120 to the positive terminal of the battery 63 and, for the purposes of the circuit shown at Fig. 3, it may be considered as tied directly to the positive terminal of the battery. Across the terminals of the battery 63, we provide two voltage dividers in parallel circuit relation comprising, respectively, a pair of serially connected resistors 176 and 177 and a second pair of serially connected resistors 178 and 179. An intermediate point 180 on the voltage divider 176, 177 is connected through a rectifier 181 to the low potential terminal 182 of the serially connected control field windings 170 and 171. Similarly, an intermediate point 183 on the voltage divider 178, 179 is connected through a rectifier 184 to the point 182. Rectifiers 181 and 184 are so disposed that they conduct current only from the points 180 and 183, respectively, to the point 182. The resistor 173 is connected between the point 182 and the negative terminal of the tachometer generator. The self-excited field winding 127 of the tachometer generator 125 is connected between the negative terminal of the tachometer generator and the negative grounded terminal of the battery 63 through a rectifier 185 disposed to pass current only from ground through the winding 127 to the negative terminal of the tachometer generator.

Figure 10:
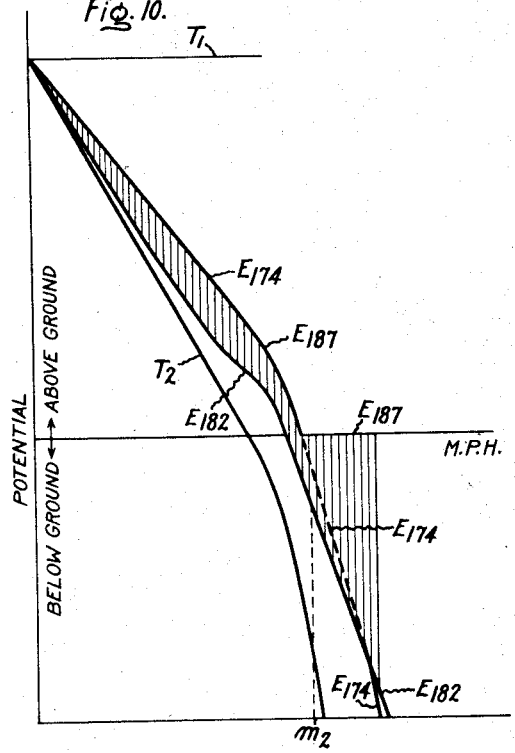
Figure 9:
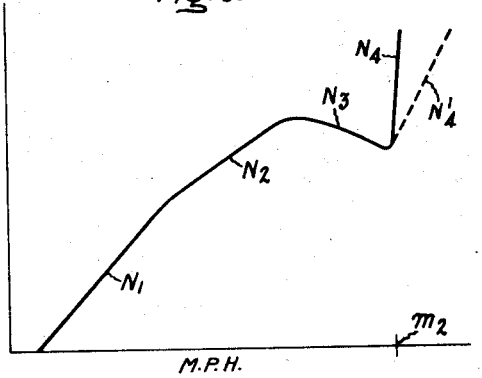

The operation of the excitation circuits for the motor exciter control field windings 170 and 171 thus far described will now be evident from a joint consideration of Figs. 3, 9, and 10. The positive terminal of the tachometer generator 125, being tied directly to the positive terminal of the battery 63 through the rectifier 175, remains at the constant positive battery potential. This is indicated by the straight line $T_1$ of Fig. 10 which represents the potential of the positive terminal of the tachometer at various vehicle speeds. At Fig. 10, the potential of the negative terminal of the tachometer is indicated by the curve $T_2$. It appears now from Fig. 10 that the tachometer voltage, being the difference between the curves $T_1$ and $T_2$ of Fig. 10, increases linearly with vehicle speed until the voltage of the tachometer negative terminal goes below ground potential. At this point, the rectifier 185 becomes conducting to pass current through the auxiliary tachometer field exciting winding 127 thereby to increase the rate of change of tachometer voltage with vehicle speed, as shown by the lower portion of the curve $T_2$ at Fig. 10.

As the tachometer voltage increases linearly with speed over the first portion of its range, the voltage applied from the voltage divider 132 through the rectifier 172 to the motor exciter control field windings 170 and 171 also increases linearly, as indicated at the first portion $N_1$ of the curve shown at Fig. 9. This is shown also at Fig. 10 where the curve $E_{174}$ indicates the potential at the point 174 and the curve $E_{182}$ indicates the potential at the point 182. The difference between the potentials indicated by these curves is the potential applied across the motor exciter control field windings 170 and 171.

The effect of exaggerating the series characteristic of the motors 16 and 17 by differential energization of the exciter field windings 170 and 171 is also shown at Fig. 8. Fig. 8 shows the relation between vehicle speed and line current from zero speed up to a maximum speed. The maximum vehicle speed is indicated at Fig. 8 as $M_2$. The manner in which the vehicle speed is limited to this maximum will be described hereinafter, but for the present it is sufficient to note that the broken line curve P of Fig. 8 indicates the manner in which the line current would diminish as the vehicle speed increases were it not for the additional field weakening due to the energization of the motor exciter control field windings 170 and 171. Also, at Fig. 8, the substantially straight line M indicates the normal maximum current limit which, as has been heretofore explained, diminishes as the vehicle speed increases. As described in the preceding paragraph, the excitation of the control field windings 170 and 171 increases with vehicle speed, and this increase is substantially linear over a portion $N_1$ of the curve of Fig. 9, so that the line current of Fig. 8 follows a curve $P_1$, rather than the curve P. As indicated at Fig. 8, the departure of the curve $P_1$ from the curve P becomes more pronounced as the energization of the field windings 170 and 171 increases. Thus, if the energization of the exciter control field windings 170 and 171 were allowed to continue to increase linearly with vehicle speed, the line current $P_1$ of Fig. 8 would approach the current limit line M before the vehicle attained its desired maximum speed.

Since it is undesirable to allow the line current to increase toward the current limit below maximum vehicle speed and it is, in fact, desirable to keep the line current as constant as possible, the rate of increase of energization of the motor exciter control field windings 170 and 171 is diminished and, in fact, a net decrease in their energization is eventually produced by action of the voltage dividers 176, 177 and 178, 179. Referring now to Fig. 3, it will be observed that, as soon as the potential at the point 182 drops below the potential at the point 183, the rectifier 184 begins to conduct current through the resistor 173, thereby to prevent the potential at the point 183 from dropping as rapidly as it otherwise would. This action causes the energization of the motor exciter control field windings 170 and 171 to increase at a lesser rate, as shown by the portion $N_2$ of the curve of Fig. 9. As higher vehicle speeds are approached, it is desirable to cause a decrease in the line current $P_1$ of Fig. 8 in order to maintain the line current below the current limit until the desired maximum vehicle speed is attained. This decrease in main line current is attained by the action of the voltage divider 176, 177 and the rectifier 181. From the foregoing explanation of the action of the voltage divider 178, 179, it will be understood that, as the voltage at the point 182 of Fig. 3 decreases below the voltage at the point 180 on the voltage divider 176, 177, the rectifier 181 will become conducting to pass additional current through the resistor 173, thereby further to reduce the rate of decrease of the potential of the point 182 with respect to the potential of the point 174 on the voltage divider 132. This action is shown at Fig. 10 by the difference between the curves $E_{174}$ and $E_{182}$ and also at the curve of Fig. 9 by the portion $N_3$ of the curve showing a net decrease in excitation of the control field windings 170 and 171. It will, of course, be understood from the foregoing that the shape of the excitation curve shown at Fig. 9 may be controlled by more than two voltage dividers connected across the battery, or by differently proportioning the resistors in the circuit. For the present purpose, however, two voltage dividers have been found sufficient and only two have been shown for the purpose of illustration only.

Vehicle speed limit

In addition to their function of exaggerating the series excitation characteristic of the traction motors, the motor exciter field windings 170 and 171 are connected between the negative terminal of the battery 63 and the negative terminal of the tachometer generator 125 through a rectifier 186 to provide a vehicle speed limit control. From Figs. 3 and 10 it may readily be observed that, as soon as the voltage of the high potential terminal 187 of the windings 170 and 171 decreases to slightly below the ground potential of the negative terminal of the battery 63, current will flow from ground through the rectifier 186 and the control field windings 170 and 171 to the negative terminal of the tachometer generator. This condition is illustrated at Fig. 10 where the potential $E_{187}$ of the point 187 is shown remaining constant only slightly below zero or ground potential beyond the speed $m_2$, even though the potential of the point 174 falls below ground potential. In this range, the rectifier 172 becomes non-conducting and a large excitation current is supplied to the control field windings 170 and 171 through the rectifier 186. This rapid increase in excitation of the motor exciter differential field windings is shown at the portion $N_4$ of the curve of Fig. 9.

It may be noted here that one effect of the tachometer generator self-excited field winding 127 is to make the speed limit more critical. At Fig. 9 we have shown a broken line curve $N'_4$ illustrating the manner in which the excitation of the exciter windings 170 and 171 would increase after spill-over through the rectifier 186 if the tachometer voltage were not increased at high speed by the field winding 127. It is evident that the curve $N'_4$ represents a less critical speed limit than does the curve $N_4$.

The rapid increase in energization of the differential windings 170 and 171 at the vehicle speed $m_2$ causes a sharp decrease in the net motor exciter excitation, and therefore in the net motor excitation, so that the line current will increase sharply as indicated at the speed $m_2$ at Fig. 8. Such sharp increase in the line current will bring the line current up to the current limit value at the existing speed of operation, as indicated at Fig. 8, so that the current limit circuit previously described will be brought into operation. With the motor current limited to a maximum value, the motor power is determined by the motor voltage. The motor voltage is proportional to the motor speed and to the excitation of the motor field windings, so that, with the motor speed remaining at the maximum value and the motor excitation severely limited by the increased excitation of the motor exciter field windings 170 and 171, the motor power will drop off thereby to reduce the vehicle speed. When the vehicle speed is thus reduced, the tachometer generator voltage is reduced below the spill-over value of the rectifier 186 and excitation of the motor exciter differential field windings through this rectifier ceases. It will thus be clear that the system will regulate on this point to maintain the vehicle speed at its maximum value.

The above operation of the system under speed limit conditions will be clarified by a consideration of Fig. 5. As previously explained, a portion E on the volt-ampere characteristic of Fig. 5 is determined by operation of the current limit circuit at zero or low vehicle speed. It will be understood that, as the vehicle speed increases, the current limit is reduced, as indicated by the constant current lines $E_1$ and $E_2$ of Fig. 5. It will now be evident that, if the vehicle is operating at a point 190 on the curve C of Fig. 5 when the vehicle speed approaches its maximum value, the sharp increase in motor exciter differential field excitation produced by the speed limit circuit and indicated at Fig. 9, and the consequent sharp increase in line current indicated at Fig. 8 will cause the operating point 190 of Fig. 5 to move down the curve C to the maximum speed current limit curve $E_2$ and, hence, down the current limit curve $E_2$ to a point such as 191 at Fig. 5. It will be clear that the system power represented at the point 191 is less than that represented by the constant power curve C, so that the power output of the motors will be reduced and further increase in vehicle speed prevented.

Stabilization of motor excitation

It will be understood from the foregoing that when the vehicle is moving forward under power, the counter electromotive force of the motors is almost equal and opposite to the output voltage of engine driven generator 12. Since the motor voltage is proportional to the product of the motor flux and the motor speed, it is apparent that when the vehicle is traveling at a relatively high speed the motor flux is quite weak while the generator 12 is operating under partial saturation in its upper range of voltage. Under such conditions, it will be evident that the motor exciters 14 and 15 are capable of forcing an extremely rapid change of motor field flux with only a relatively small change in motor field energization, while because of the generator field saturation a relatively large voltage change of the generator exciter 13 is necessary to produce a proportional change of the generator field flux. Accordingly, if the excitation of the traction motors is suddenly reduced or reversed to initiate dynamic braking operation, it will be clear that a transient current of considerable magnitude might flow in the generator output circuit because of the fact that the motor field flux will reverse much more rapidly than the generator flux can be reduced by operation of the current limit circuit. For the purpose of bringing this undesirable condition within permissible limits, the motor exciters 14 and 15 are provided with stabilizing control field windings 192 and 193, respectively. Referring now to Fig. 1, it will be observed that the positive terminal of the motor exciter 15 and the negative terminal of the motor exciter 14 are each grounded through the low resistance series load compensating windings 144 and 145 and that the positive terminal of the motor exciter 14 is connected through the stabilizing control field winding 192, a condenser 194, and the stabilizing control field winding 193 to the negative terminal of the motor exciter 15. Thus, when the system is operating under steady state conditions, no current flows through the stabilizing windings 192 and 193, the condenser 194 merely being charged to a potential equal to the sum of the potentials across the output terminals of the motor exciters 14 and 15.

It may now be observed that, if the voltages across the output terminals of both motor exciters are changing in the same sense, that is, if increased or decreased motoring or braking torque is simultaneously being called for on both exciters, or if the excitation of both exciters is suddenly and simultaneously changed from forward excitation to reverse excitation to shift from motoring to braking operation, the condenser 194 is charged or discharged, in dependence upon the direction of change, through the stabilizing control field windings 192 and 193. These stabilizing windings are so arranged that the components of field excitation which they produce under such conditions of change in the motor exciters 14 and 15 tend to oppose the change of voltage in each machine. In this manner, the rate of change of output voltage of the motor exciters is sufficiently decreased so that the differential current limit excitation of the generator exciter is able to make the flux of the generator field 90 follow the motor flux sufficiently closely to prevent an exceedingly high transient current during the rapid change of motor excitation.

If now the voltage of only one of the motor exciters is changed, either by increasing or decreasing the field excitation of that motor, while the voltage of the other motor exciter is maintained constant, the condenser 194 will also undergo a change in charge. In this case, however, the current through the stabilizing field windings 192 and 193 will be in the same direction in both windings, so that current through the stabilizing winding of that motor exciter whose voltage is undergoing change will tend to oppose the change, while the current through the stabilizing winding of that motor exciter whose field excitation is not otherwise undergoing change will tend to produce a change of voltage of that exciter in the direction opposite to the voltage change in the first exciter. This latter effect is desirable in connection with the steering operation, as will appear hereinafter. Steering is effected by moving only one steering handle to change the torque of the associated motor. In order that maximum steering efficiency may be effected, means are preferably provided for automatically changing the torque of the other motor in the opposite direction without necessitating movement of the other steering handle. It will be clear that the above transient effect aids such a change.

Steering

As briefly mentioned in the foregoing paragraph, steering of the vehicle is effected by actuating one or the other of the steering handles 157 and 158 to reduce or reverse the torque of the associated motor without similarly reducing the torque of the other motor, thereby to cause the vehicle to turn toward the side upon which the motor torque is reduced or reversed. Referring to Fig. 1, if the steering handles are in the full forward motoring position shown, steering may be effected by pulling one handle, for example the right-hand steering handle 158, backward toward or to the null position. If very abrupt steering is required, the handle may be pulled back into the reverse quadrant to effect a reversal of torque and braking operation of the right-hand motor 17. During such operation, the left-hand motor 16 continues to exert a forward motoring torque. It will of course be understood that if the vehicle is traveling in the reverse direction steering is effected by moving one handle toward or into the forward quadrant.

In order to effect steering with a minimum of disturbance of the main line current, it is desirable to maintain substantially constant the net motor voltage during steering operation. Means are therefore provided for automatically increasing the excitation, and hence the torque, of the motor whose steering handle is not disturbed when the voltage torque of the other motor is decreased. For example, if the steering handle 158 is drawn toward the null point of the potentiometer 149 and the steering handle 157 is left in the position shown, the resistance of the rheostat 153 will be gradually diminished and will be completely cut out when the handle 158 reaches the null point. Referring now to Fig. 4, it will be evident that as the rheostat 153 is cut out, the voltage applied to both double potentiometers 148 and 149 is gradually increased. Thus, since the steering handle 157 is not moved, the excitation of the motor exciter 14 is increased thereby to increase the voltage and torque of the motor 16. Of course, the voltage applied to the potentiometer 149 also is increased, but the reverse movement of the handle 158 takes precedence, so that the resultant excitation of the motor exciter 15 is decreased, thereby to decrease the voltage and torque of the motor 17. By suitable proportioning of the various elements of the system, the rheostat 153 may be caused to increase the voltage of the motor 16 by the same amount as the voltage of the motor 17 is decreased by the steering handle 158 until the null point is reached and the rheostat 153 is completely cut out. It will be clear that if the handle 157 is moved and the handle 158 left stationary, the rheostat 152 will have the effect of increasing the voltage of the motor 17.

Control of current limit by steering

To effect severe steering operation, one of the steering handles may be pulled into the reverse quadrant, while the other handle is left in the forward quadrant of the associated potentiometer 148 or 149. For added maneuverability of the vehicle, the response to such a demand for abrupt steering is enhanced by providing a temporary increase in the forward torque upon the forward running track and an increase in the braking torque upon the reversed track. Such a temporary increase in the differential or steering torque is rendered possible by boosting the current limit above the normal current limit value for the existing speed of operation in response to the positioning of the steering handles in opposite quadrants.

Continuing with the example assumed, let it be supported that the steering handle 158 is moved into the reverse quadrant. Referring now to Fig. 2, it will be evident from the foregoing description of the apparatus connected to the steering handle 158 that the switch 135 will be closed as soon as the handle 158 is moved backward a predetermined small distance from its normal position. The closure of this switch, however, has no effect since the steering handle 157 is not moved and the switch 134 therefore remains open. The handle 158 also actuates the rheostat 124. This rheostat effects no change of resistance so long as the handle 158 is in its forward quadrant, but as soon as the handle enters its reverse quadrant the rheostat 124 begins to insert resistance into the series spill-over circuit through the current limit control field winding 93 on the generator exciter 13. The resistance of the rheostat 124 increases as the handle 158 is moved further toward its extreme reverse position. It will of course be understood that, had the steering handle 158 been left in its normal forward position and the handle 157 moved into its reverse quadrant, the rheostat 123 would insert resistance in the current limit circuit. Thus, whenever steering is called for to the extent of leaving one handle in its full forward position and moving the other handle into its reverse quadrant, resistance is added in the current limit spill-over circuit through the generator exciter control field winding 93. Such series resistance reduces the differential excitation of the exciter 13 for any line current sufficient to cause breakdown of the current limit circuit. The resistance of the rheostats 123 and 124 is sufficient that the current through the differential field winding 93 under severe steering conditions is ineffective to prevent further increase in the line current until the line current attains a value appreciably higher than that at which current limit spill over was initiated. Thus, while the rheostats 123 and 124 do not affect the spill-over current value, the effect of spill over is rendered less abrupt so that the effective current limit value is increased during severe steering, as indicated by a curve M₁ of Fig. 8.

It will be understood that if the power demand is such that the vehicle is operating at the line current limit, the temporary increase in current limit value resulting from movement of only one steering handle into its reverse quadrant will increase both the effective reverse or braking torque on the associated motor and the forward torque upon the other motor. This increase in torque is occasioned primarily by the increased current and, to a lesser extent, by the increasing motor voltages. The differential torque available for steering is therefore substantially increased.

It may now be noted that, if both steering handles are simultaneously moved into their reverse quadrants to effect braking operation without steering, both switches 134 and 135 will be closed, thereby to shunt the rheostats 123 and 124, so that actuation of these rheostats over their live sections has no effect upon the operation of the current limit circuit.

Dynamic braking operation

Dynamic braking operation without steering is effected by drawing both steering handles 157 and 158 simultaneously from their forward quadrants into their reverse quadrants. As will be explained hereinafter the motor voltage reverses in braking operation and disables the current limit circuit at the contact 121 of the contactor B. However, in the short interval between initial steering handle movement and voltage reversal the current limit circuit remains effective. During this interval the rheostats 123 and 124 are ineffective to raise the current limit because they are shunted by the switches 134 and 135, as explained in the preceding paragraph. However, the rheostats 152 and 153 are effective, as the steering handles are moved toward the braking quadrants, to increase the voltage applied to the motor field windings 140 and 141, as explained heretofore in connection with the steering operation.

While the dynamic braking torque at low line currents is maintained in the manner described above, means are also provided for limiting the braking torque at high line currents. The need for such a limitation will be appreciated when it is realized that under braking conditions the field excitation of the traction motors 16 and 17 is reversed, so that these motors act as generators, their voltages adding to that of the main engine driven generator 12. Under these conditions, the series excitation characteristic of the traction motors becomes a series generator characteristic having a marked cumulative effect. That is, as the excitation of the traction motors is increased in a braking sense, the line current is increased and, as the line current is increased, the excitation of the traction motors is further increased. This effect is aggravated by the transient current discussed above in connection with the motor exciter stabilizing windings. It will be recalled that transients resulting from the inability of the generator to reduce its voltage as quickly as the motor voltage is reduced are apt to cause temporary overshooting of the current limit. While the motor exciter stabilizing windings 192 and 193 limit this overshooting to permissible values, it is also desirable to limit the braking torque when such high line currents exist. Indeed, it has been found desirable to limit the braking torque at high line current even though such current does not exceed the current limit value. For this purpose, we provide means for limiting the excitation of the traction motors 16 and 17 to a predetermined maximum value so that the series excitation characteristic of the motors is transferred to a constant or shunt excitation characteristic upon the occurrence of a predetermined high line current. Fig. 4 shows the manner in which the energization of the main motor exciter control field windings 146 and 147 is limited to a definite maximum value. As has been previously pointed out, Fig. 4 shows the potentiometer bridge 148 (the bridge 149 being connected in parallel therewith) connected across the commutating windings 18, 19, and 20 in the generator output circuit in series with the resistor 151 and the rheostats 152 and 153. It is understood that normally the basic series characteristic of the motor exciter winding 146 arises from the fact that the potential at the point 154 of the potentiometer 148 is proportional to the voltage drop across the commutating pole windings 18, 19, and 20 as derived through the resistor 151 and rheostats 152 and 153. As explained hereinbefore, this proportionality is modified to some extent in braking and steering operation by reduction of resistance of the rheostats 152 and 153. In order to limit the potential at the point 154 to a predetermined maximum value, this point is tied through a blocking rectifier 200 to a point of intermediate voltage 201 on the battery 63. So long as the potential of the point 154 remains below that of the point 201 on the battery 63, current cannot flow from the battery through either the potentiometers 148 or the commutating pole windings 18, 19, and 20 because of the presence of the blocking rectifier 200. However, should the line current through the commutating pole windings 18, 19, and 20 attain such a value that the potential of the point 154 tends to attain a value in excess of the potential of the point 201, current will spill over from the point 154 through the rectifier 200 and the connected portion of the battery 63 to ground, thereby to limit the potential of the point 154 to a predetermined maximum value. For line currents above the spill-over value of the rectifier 200, the potential at the point 154 remains substantially fixed regardless of the value to which the line current extends, and hence the potential drop across the commutating pole windings 18, 19, and 20, may go. In this manner, the undesirable cumulative effects of motor field strength are minimized when going into dynamic braking operation. It will be understood that the excessive potential at the point 154 may not be due alone to a simple resistance drop across the commutating pole windings 18, 19, and 20, but that, upon a very rapid change in line current as due to a quick reversal of the traction motor field windings, such an extensive potential may arise in part from the induced voltage in the commutating pole windings.

Under conditions of rapidly changing line current in suddenly going into braking operation as described above, the inductive potential appearing across the commutating pole windings 18, 19, and 20 is utilized to hasten the decrease in excitation of the generator 12 to its steady state value. For this purpose, the differential energization of the main control field winding 94 on the generator exciter 13 is arranged to go to exceedingly high values. It will be recalled that the differential excitation component for the control field winding 94 is derived from a potentiometer 103, 104, 105 connected across the commutating pole windings 18, 19, and 20, so that any inductive voltage appearing at the positive terminal of the generator 12 will provide a transient increase in energization of the winding 94, and hence a rapid decrease in the net excitation of the generator exciter 13 of the generator 12. The transient increase in potential of the positive terminal of the generator 12 also tends to bring into operation the line current limit circuit previously described, so that the excitation of the exciter 13 may be further decreased by spill-over through the current limit circuit if a sufficiently large line current surge occurs before motor voltage reversal causes opening of the contactor B to disable the current limit.

*Operation*

In view of the foregoing detailed explanation of the various parts of our system and their manner of connection and mode of operation, the operation of the system as a whole will be readily understood from the following brief description taken from the viewpoint of an operator.

Three simple and convenient controls are provided at the driver's position, namely, the accelerator pedal 32 for controlling the speed and power output of the internal combustion engine 10, and the left and right steering handles 157 and 158, respectively, for independently controlling the torque and direction of rotation of the left- and right-hand tracks. As previously described, the steering handles 157 and 158 are provided with "dead man" interlocks 62 and 62a, respectively, each normally biased to maintain closed one of two pairs of associated contacts.

Assuming first that the vehicle is at standstill and the engine not running, the engine may be set in operation by closing the switch 66 and depressing the engine starting button 71. This starting operation has been described under the section on Engine control. With the engine now running at its idling speed, motoring operation is initiated simply by grasping one or both of the steering handles to close the normally open contacts of at least one of the interlock switches 62 and 62a. The "dead man" interlock switches 62 and 62a are so arranged that, if either one or both of these switches is actuated, the shunt circuit around the rheostat 57 is disabled and one terminal of the generator exciter potentiometer 49 is connected to ground as described in connection with Fig. 2. Closure of either or both of the "dead man" interlock switches also connects one terminal of an energizing winding 202 for a time delay relay TDR to ground. When the governor control rheostat 57 is unshunted by the "dead man" interlocks, the setting of the governor is raised to maintain a predetermined minimum running speed of the engine 10 and to assure adequate power for steering or braking even though the accelerated pedal 32 should be released during running operation.

Closure of one of the "dead man" interlocks 62 and 62a to initiate motoring operation also completes an energizing circuit through a reverse power relay RPR for an actuating winding 203 of the braking contactor B. The braking contactor B is normally open, but is closed during motoring operation to shunt the braking resistor 21 in the main generator output circuit. The reverse power relay RPR is provided with a polarizing winding 204 and a directional winding 205. Upon closure of one of the "dead man" interlocks 62 and 62a, an energizing circuit is completed for the polarizing winding 204 from the wire B+ through a resistor 206 and the polarizing winding 204 to ground. When so energized the reverse power relay RPR picks up and closes a normally open interlock contact 207. Through the contact 207 an energizing circuit is completed for the actuating winding 203 of the braking contactor B. This circuit may be traced from the wire B+ through the contact 207, the actuating winding 203, and a normally closed interlock contact 208 on the time delay relay TDR to ground. Thus energized, the braking contactor B picks up to close the shunting contact 22 around the braking resistor 21 and to complete for its actuating winding 203 a holding circuit through a self-actuated normally open interlock contact 209. When the contactor B picks up an interlock contact 210 on the contactor B connects the ungrounded terminal of the potentiometer 49 to the wire B+ thereby to complete an energizing circuit for the generator exciter control field winding 94. Closure of the contact 210 also completes circuit for the actuating winding 202 of the time delay relay TDR. Opening of the time delay relay contact 208 has no effect for the present, since is now shunted by the lock-in contact 209 on the contactor B.

By way of summary, then, simple closure of one or the other of the "dead man" interlock contacts 62 or 62a immediately increases the engine speed to a predetermined minimum running value, picks up the braking contactor B to shunt the braking resistor 21, and completes a field excitation circuit for the generator exciter 13. The current now generated flows in the motor armature circuit and produces a voltage drop across the commutating pole windings 18, 19, and 20 thereby to energize the main control field windings 146 and 147 of the motor exciter 14 and 15 through the potentiometer bridges 148 and 149, respectively, so that a torque is supplied by the driving motors. Since the steering handles 157 and 158 are now in their normal positions of maximum forward torque, the vehicle will begin to accelerate from standstill in the forward direction. Assuming that the accelerator pedal 32 is still in its idling position, it will be evident that, as the vehicle comes up to speed, the motor current falls off and the voltage rises from a point 211 on the IR line F of Fig. 5 and along a minimum running engine speed power curve $C_1$ to some point, such as the point 212. It will be understood that as the line current diminishes the motor torque also diminishes, so that the point 212 is determined as that point at which the total motor torque just overcomes the resistance to motion of the vehicle.

With the establishment of a current in the generator output circuit, the directional winding 205 of the reverse power relay RPR is energized in proportion to the motor voltage and cumulatively with respect to the polarizing winding 204 of the reverse power relay. The winding 205 thus tends to hold the reverse power relay in its actuated position.

To increase the speed of the vehicle, the accelerator pedal 32 is depressed in the manner heretofore described. The pedal actuated contactor 110 first controls the excitation of the generator exciter field winding 94 while the engine speed remains at its minimum running value, as described in connection with Fig. 2. After opening of the switches 111, 112 and 113 the engine is speeded up and its power increased by control of the governor rheostat 59 in the manner heretofore described. The vehicle will therefore speed up until the increased motor torque just balances the resistance of the terrain over which the vehicle is operating. It should be noted that the speed of the vehicle cannot be increased simply by moving the steering handles forward (assuming that they had previously been removed from the maximum forward position) to increase the motor excitation. This will be evident from a consideration of the fact that no greater power is thereby supplied to the motors since the generator power output is not changed by moving the steering handles. The only effect of moving the steering handles forward simultaneously is to increase the motor voltage and thus decrease the motor current so that the operating point moves along one of the constant horsepower curves, such as those shown at Fig. 5, to a higher voltage point.

If, during forward motoring operation, the accelerator pedal is depressed sufficiently far to increase the vehicle speed to its maximum value, the speed limit circuit functions in the manner heretofore described to diminish the excitation of the traction motors. Preferably, a visual or audible indication of the operation of the speed limit circuit is provided. The operation of the speed limit circuit and its relation to current limit operation has been explained hereinbefore. So far as the operator is concerned, functioning of the speed limit circuit should be taken as a signal for releasing the accelerator pedal to some extent, thereby to reduce the power output of the engine and to permit the system operating point to move off the current limit. This is desirable, as obviously it is more efficient to operate the system at low current and high voltage than to operate it at low voltage and high current.

An outstanding feature of the described arrangement is that, in the event that the vehicle while motoring forward encounters a downhill grade and the operator makes no attempt to check the vehicle speed, the speed limit circuit will operate not only to reduce the engine horsepower output in the manner previously explained, but will actually reverse the net excitation of the traction motor field windings thereby automatically to initiate dynamic braking operation and to maintain the vehicle at the maximum permissible speed. To illustrate, let it be assumed that the vehicle is brought to a steep downhill grade with the engine 10 running at its maximum speed and the steering handles 157 and 158 pushed forward to their maximum torque positions as shown at Fig. 1. As the vehicle speed increases, the voltage of the tachometer generator 125 will become so great that the current spilled over from the grounded terminal of the battery 63 to the negative terminal of the tachometer generator through the rectifier 186 and the motor exciter differential windings 170 and 171 will become sufficient completely to overpower the main motor exciter control field windings 146 and 147 and to reverse the net excitation of the motor exciters 14 and 15 and the motors 16 and 17 thereby to initiate dynamic braking operation.

The manner in which the vehicle may be steered by reducing or reversing the torque on one or the other of the motors has been previously described. Also, dynamic braking without steering by simultaneous transfer of the steering handles 157 and 158 to their reverse quadrants has been explained with reference to the motor field excitation circuits. It may now be noted, however, that when such dynamic braking operation is initiated, the back electromotive force of the traction motors 16 and 17 is reduced to zero and then reversed. As the back electromotive force of the traction motors approaches zero or begins to reverse in going into braking, the directional winding 205 of the reverse power relay RPR functions to drop out the reverse power relay thereby to deenergize the actuating winding 203 of the braking contactor B and to cause the contactor B to drop out and unshunt the braking resistor 21. During dynamic braking operation, the power generated by the generator 12 and the traction motors 16 and 17 is absorbed in the braking resistor 21. Proper operation of the reverse power relay RPR is ensured by a plurality of capacitors 213, 214, and 215 connected in series circuit relation across adjacent portions of a resistor 216 in the circuit of the directional winding 205. These capacitors function to cause the reverse power relay to anticipate its normal setting sufficiently so that even when the rate of change of motor voltage is greatest the contactor B is opened at the desired time. As braking proceeds with the motor voltage reversed the reverse power relay RPR remains dropped out and the braking contactor B likewise remains deenergized. As the motor voltage decreases with decreasing vehicle speed, the voltage of the main generator 12 increases to maintain the continuing unidirectional current in the main line circuit. Since current is maintained in both the motor armatures and field windings, dynamic braking may be made effective until the vehicle reaches standstill.

Opening of the braking contactor B indicating that dynamic braking is in process also effects a number of protective functions necessitated by braking operation. In the first place, the interlock contact 121 of the contactor B disables the current limit circuit, thereby to remove the current limit effect during dynamic braking. This will be evident from Fig. 2 and is necessitated by the fact that the voltage of the engine driven generator 12 cannot be permitted to reverse under the influence of differential component of excitation of the exciter control field winding 94 in an attempt to maintain the line current at the current limit value. If the generator voltage were permitted to reverse, it would mean that the generator was acting as a motor to drive the internal combustion engine 10. While slight overspeeding of the engine 10 is permissible, any substantial overspeeding must be avoided in order to prevent damage to the engine. When the contactor B drops out, forward battery excitation of the exciter field winding 94 is maintained through a normally closed interlock contact 217 on the reverse power relay RPR. Since the line current limit circuit is disabled during dynamic braking by the braking contactor B, it will now be evident that the shunting effect of the steering handle switches 134 and 135 prevents the rheostats 123 and 124 from raising the current limit only for the short interval between entry of the steering handles into their reverse quadrants and drop out of the contactor B upon actual reversal of motor voltage. From the foregoing explanation, it is clear that transient conditions during this interval tend to increase the line current to a very high value, so that it is desirable to retain low current limit protection. After the contactor B drops out and disables the current limit circuit, the shunt excitation characteristic of the traction motors at high line currents is effective to prevent excessive currents.

During dynamic braking operation while the reverse power relay RPR remains dropped out, energization of the braking contactor actuating winding 203 is precluded by the time delay relay TDR, the actuating winding 202 of which is maintained energized through the normally closed interlock contact 217 on the reverse power relay RPR which shunts the now open interlock contact 210 on the contactor B. When dynamic braking is completed and the vehicle speed is reduced to zero, the RPR relay recognizes this fact by the fact that the motor voltage is substantially zero. The reverse power relay then picks up and deenergizes the main generator exciter control field winding 94 at the RPR interlock contact 217. Opening of the contact 217 also deenergizes the time delay relay TDR. Drop-out of the time delay relay TDR takes place only after a predetermined interval, and during this interval the generator exciter control field winding 94 receives only differential energization through the potentiometer 103, 104, 105, thereby to reduce the generator voltage rapidly to zero. After a suitable time, which is just sufficient to allow the line current to come approximately to zero, the time delay relay TDR drops out and closes the interlock contact 208. Closure of the contact 208 completes an energizing circuit for the actuating winding 203 of the braking contactor B. The contactor B picks up and locks itself in through its interlock contact 209. It will be understood of course that at this time the operator will release the "dead man" handle interlock contacts 62 and 159 and return the steering handles 157 and 158 to their normal biased positions. If the operator retains the handles in the braking position, the reenergization of the braking contactor B will complete an energizing circuit for the generator exciter control field winding 94 through its interlock contact 210 and will initiate reverse motoring operation.

Referring now to Fig. 4, the purpose of a blocking rectifier 218, not previously mentioned, will become evident. The rectifier 218 is located between the points 154 and 155 of the potentiometer bridges 148 and 149 and ground, and has for its purpose the prevention of a reverse current in the main line circuit. Let it be assumed, for example, that the steering handles 157 and 158 are moved to braking position with the "dead man" handle interlocks 62 and 159 open. Under these conditions the energizing circuit for the generator exciter control field winding 94 would be disabled, so that there would be nothing to determine the direction of current flow in the generator output circuit. A reverse line current can start at the system and, under such conditions, the reverse power relay RPR would pick up under the influence of the directional winding 205 alone and cause closure of the braking contactor B. The traction motors 16 and 17 would therefore build up as series generators, but without the braking resistor 21 in the main line circuit, so that all the power would be absorbed in motoring of the generator 12 and consequent overspeeding of the engine 10. The blocking rectifier 218 serves to prevent the motors from receiving any excitation due to a reverse line current, so that braking under such conditions is not possible. Thus, at Fig. 4, it will be evident that if the potential of the points 154 and 155 on the potentiometers 148 and 149 is below ground, as due to a reversal of line current, the potentiometers 148 and 149 will be short-circuited through the rectifier 218.

From the foregoing detailed explanation, it will now be clear that we have provided a very flexible motor control system of the controlled circulating current type, particularly suitable for electric vehicle propulsion systems and having a number of features enhancing the speed of response and the maneuverability of a vehicle to which the system may be applied. Generator field heating losses are reduced by limiting the generator shunt field current to a predetermined maximum at low line currents. Means are also provided for reducing generator excitation and hence line current in a plurality of steps while maintaining a fixed minimum engine speed to permit low speed running but without reducing the maximum available standstill torque at the low engine speed. This permits low speed operation at high available torque, and is in that sense similar to low gear operation of mechanical drives. By control of motor differential excitation the line current is rendered substantially constant over a wide range of vehicle speeds and the speed limit is made more critical. New and improved means are also provided for facilitating extreme steering by temporarily raising the current limit in response to a severe steering demand.

While we have illustrated only a preferred embodiment of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. An electric motor control system comprising a direct current generator arranged to supply current to an output circuit, a direct current motor having its armature connected in said output circuit, excitation means for said generator including main and differential field exciting windings, means non-responsive to current of less than a selected maximum value in said output circuit for energizing said differential field exciting winding to reduce the excitation of said generator only when said output circuit current exceeds said maximum value, and means responsive to the speed of said motor for selecting said maximum current value in accordance with said speed.

2. An electric motor control system comprising a direct current generator arranged to supply current to an output circuit, a direct current motor having its armature connected in said output circuit, excitation means for said generator including main and differential field exciting windings, means including unidirectional conducting means and a source of substantially constant unidirectional potential for energizing said differential winding only upon the occurrence of a selected maximum current in said output circuit, and means responsive to the speed of said motor for reducing said selected maximum current value as the speed of motor increases.

3. An electric motor control system comprising a direct current generator arranged to supply current to an output circuit, a direct current motor having its armature connected in said output circuit, excitation means for said generator including main and differential field exciting windings, means for limiting the current in said output circuit to a selected maximum value comprising unidirectional conducting means connecting said differential winding for energization across a portion of said output circuit and only in opposition to a source of substantially constant potential, said unidirectional conducting means being connected in series circuit relation with said differential winding to prevent energization of said winding from said source of constant potential, and means for selecting said maximum current limit value in accordance with the speed of said motor comprising a source of unidirectional bias potential having a magnitude proportional to said speed and interposed in said series circuit in opposing relation to said source of constant potential.

4. A motor control system comprising a direct current generator arranged to supply current to an output circuit, a direct current motor having its armature connected in said output circuit, a main field exciting winding for said generator, an auxiliary dynamoelectric machine connected to supply excitation current to said field exciting winding, means for limiting the current in said output circuit to a selected maximum value comprising a differential field exciting winding for said auxiliary dynamoelectric machine connected for energization across a portion of said output circuit and only in opposition to a source of substantially constant potential, a rectifier bridge connected through diagonally opposite terminals in series circuit relation with said differential winding to preclude energization of said winding from said source of constant potential, said bridge providing a low resistance energizing circuit for said differential winding from said output circuit, and means for selecting said maximum current limit value in accordance with the speed of said vehicle comprising a tachometer generator connected to superpose upon said diagonally opposite terminals of said rectifier bridge a unidirectional potential proportional to vehicle speed and disposed in opposing relation to said source of constant potential.

5. A power system for a self-propelled electric vehicle comprising an internal combustion engine, a direct current generator driven by said engine and arranged to supply current to an output circuit, a direct current motor having its armature connected in said output circuit, excitation means for said generator including main and differential field exciting windings, means for energizing said main field exciting winding differentially in accordance with the current in said output circuit, means non-responsive to current of less than a selected maximum value in said output circuit for energizing said differential field exciting winding to reduce the excitation of said generator only when said output circuit current exceeds said maximum value, and means responsive to the speed of said vehicle for selecting said maximum current value in accordance with said speed.

6. A power system for a self-propelled electric vehicle comprising an internal combustion engine, a direct current generator driven by said engine and arranged to supply current to an output circuit, a plurality of direct current traction motors having their armatures connected in series circuit relation in said output circuit, separately excited individually controllable field excitation means for each of said motors, means for limiting the current in said output circuit to a predetermined maximum value selected in accordance with the speed of said vehicle independently of the effective resistance of said armatures, and speed responsive means for disabling said current limiting means below a predetermined minimum vehicle speed.

7. A motor control system comprising a direct current generator arranged to supply current to an output circuit, a direct current motor having its armature connected in said output circuit, excitation means for said generator, means responsive to the current in said output circuit and operatively associated with said excitation means for limiting said current to a selected maximum value, means responsive to the speed of said motor for modifying the control of said current responsive means to select said maximum value in accordance with the speed of said motor, and means for disabling said current limiting means within a predetermined range of low motor speeds.

8. A motor control system comprising a direct current generator arranged to supply current to an output circuit, a direct current motor having its armature connected in said output circuit, excitation means for said generator, means responsive to the current in said output circuit for reducing the excitation of said generator to limit said current to a predetermined maximum value, means responsive to the speed of said motor for modifying the operation of said current responsive means to vary said predetermined maximum current limit value inversely as the speed of said motor, and means responsive to the speed of said motor for disabling said current responsive means within a predetermined range of low motor speeds.

9. A motor control system comprising a direct current generator arranged to supply current to an output circuit, a direct current motor having its armature connected in said output circuit, excitation means for said generator, means responsive to the current in said output circuit and operatively associated with said excitation means for limiting said current to a selected maximum value, and means responsive to the speed of said motor for disabling said current responsive means at all motor speeds less than a predetermined minimum speed.

10. An electric vehicle motor control system comprising a direct current generator arranged to supply current to an output circuit, a direct current motor having its armature connected in said output circuit, excitation means for said generator including main and differential field exciting windings, means including unidirectional conducting means and a source of substantially constant unidirectional potential for energizing said differential field exciting winding to reduce the excitation of said generator only upon occurrence of a selected maximum current in said output circuit, and means responsive to the speed of said vehicle for disabling said differential field energizing means at vehicle speeds less than a predetermined minimum speed.

11. An electric motor control system comprising a direct current generator arranged to supply current to an output circuit, a direct current motor having its armature connected in said output circuit, excitation means for said generator including main and differential field exciting windings, means for limiting the current in said output circuit to a selected maximum value comprising a source of substantially constant unidirectional potential connected in series circuit relation with said differential field exciting winding across a portion of said output circuit and in opposing relation to the potential difference across said portion, unidirectional conducting means connected in said series circuit to prevent energization of said differential field exciting winding from said source of constant potential, and means responsive to the speed of said motor for disabling said series circuit at motor speeds below a predetermined minimum speed.

12. A power system for a self-propelled electric vehicle comprising a prime mover, a direct current generator connected to be driven by said prime mover and arranged to supply current to an output circuit, a direct current traction motor having its armature connected in said output circuit, excitation means for said generator arranged continuously to maintain in said output circuit a unidirectional circulating current during both motoring and dynamic braking operation of said motor, means responsive to the current in said output circuit for controlling the excitation of said generator to limit said current to a predetermined maximum value at least during motoring operation, reversible field excitation means for said motor arranged to select the direction and magnitude of motor torque thereby to control the motoring and dynamic braking operation of said motor, and means responsive to the speed of said motor for disabling said current responsive means within a predetermined range of low motor speeds.

13. A power system for a self-propelled electric vehicle comprising a prime mover, a direct current generator connected to be driven by said prime mover and arranged to supply current to an output circuit, a direct current motor having its armature connected in said output circuit, excitation means for said generator arranged continuously to maintain in said output circuit a unidirectional circulating current during both motoring and dynamic braking operation of said motor, means responsive to the current of said output circuit for controlling the excitation of said generator to limit said current to a predetermined maximum value during motoring operation, reversible field excitation means for said motor arranged to select the direction and magnitude of motor torque thereby to control the motoring and dynamic braking operation of said motor, means responsive to the polarity of motor voltage for disabling said current limiting means during dynamic braking operation thereby to prevent motoring operation of said generator and overspeeding of said engine, and means responsive to the speed of said vehicle for disabling said current limiting means at vehicle speeds below a predetermined minimum speed thereby to prevent limitation of the starting torque of said motor by said current limiting means.

14. An electric motor control system comprising a direct current generator arranged to supply current to an output circuit, a pair of direct current motors having their armatures connected in said output circuit, excitation means for said generator including a differential field exciting winding, separate manually controllable means for supplying independently variable excitation currents to said motors, means for reducing the excitation of said generator to limit the current of said output circuit to a maximum value comprising a source of substantially constant unidirectional potential connected in series circuit relation with said differential winding across a portion of said output circuit, and control means operable upon movement of only one of said manually controllable means beyond a predetermined point in its travel to insert resistance in said series circuit thereby to raise said maximum current value.

15. An electric motor control system comprising a direct current generator arranged to supply current to an output circuit, a pair of direct current motors having their armatures connected in series circuit relation to said output circuit, excitation means for said generator arranged continuously to maintain in said output circuit a unidirectional current of definitely limited magnitude, said excitation means including a differential field exciting winding connected in series circuit relation with a source of substantially constant unidirectional potential and a unidirectional conducting device across a portion of said output circuit, separate manually controllable means for supplying independently variable excitation currents to said motors thereby separately to control the motor torques, and means automatically responsive to a demand for a predetermined differential between said motor excitation currents to insert resistance in series circuit relation with said differential winding thereby to raise the limiting value of said output circuit current.

16. An electric motor control system comprising a direct current generator arranged to supply current to an output circuit, a pair of direct current motors having their armatures connected in series circuit relation in said output circuit, excitation means for said generator comprising main and differential field exciting windings, means connecting said differential winding for discontinuous response to current in said output circuit comprising a source of substantially constant unidirectional potential connected through said differential winding and a unidirectional conducting device in opposing relation to the potential difference across a portion of said output circuit, said unidirectional conducting device being disposed to permit energization of said differential winding whenever said potential difference exceeds said constant potential, separate manually controllable means for supplying independently variable excitation currents to said motors thereby separately to control the motor torques, and control means operable in response to a demand for a predetermined differential torque between said motors for inserting resistance in circuit with said differential winding thereby to decrease the initial differential excitation of said winding and effectively to raise the limiting value of current in said output circuit.

17. An electric motor control system comprising a direct current generator arranged to supply current to an output circuit, a pair of direct current motors having their armatures connected in series circuit relation in said output circuit, excitation means for said generator comprising main and differential field exciting windings, means connecting said differential winding for discontinuous response to current in said output circuit comprising a source of substantially constant unidirectional potential connected through said differential winding and a unidirectional conducting device in opposing relation to the potential difference across a portion of said output circuit, said unidirectional conducting device being disposed to permit energization of said differential winding whenever said potential difference exceeds said constant potential, separate manually controllable means for supplying independently variable excitation currents to said motors thereby separately to control the motor torques, and means actuated by said manually controllable means in response to movement of either of said controllable means to reduce and reverse the torque on only the associated motor gradually to increase the resistance of the circuit of said differential winding as said torque is reversed.

18. An electric motor control system comprising a direct current generator arranged to supply current to an output circuit, a pair of direct current motors having their armatures connected in series circuit relation in said output circuit, excitation means for said generator comprising main and differential field exciting windings, means connecting said differential windings for discontinuous response to the current in said output circuit comprising a source of substantially constant unidirectional potential connected through said differential winding and a unidirectional conducting device in opposing relation to the potential difference across a portion of said output circuit, said unidirectional conducting device being disposed to permit energization of said differential winding whenever said potential difference exceeds said constant potential, separately manually controllable means for supplying independently variable and reversible excitation currents to said motors thereby separately to control the torque and direction of rotation of each of said motors, means actuated by said manually controllable means in response to movement of only one of said means to reverse the excitation and torque of the associated motor for inserting resistance in the circuit of said differential winding thereby to decrease the differential excitation effect of said winding, and means operable in response to movement of both said manually controllable means to reverse the excitation of both said motors for rendering said control means ineffective to modify said current limit value.

19. A power system for a self-propelled electric vehicle comprising a prime mover, a direct current generator connected to be driven by said prime mover and arranged to supply current to an output circuit, a plurality of direct current traction motors connected to laterally spaced driving elements of said vehicle and having their armatures connected in series circuit relation in said output circuit, excitation means for said generator comprising main and differential field exciting windings, means for energizing said main field exciting winding differentially in accordance with the current flowing in said output circuit, means connecting said differential winding for discontinuous response to current in said output circuit comprising a source of substantially constant unidirectional potential connected through said differential winding and a unidirectional conducting device in opposing relation to the potential difference across a portion of said output circuit, said unidirectional conducting device being disposed to permit energization of said differential winding whenever said potential difference exceeds said constant potential, separate manually controllable means for supplying independently variable and reversible excitation currents to said motors separately to control the direction of rotation and torque of each of said motors, and control means actuated in response to torque reducing and reversing movement of either of said manually controllable means without like movement of the other of said manually controllable means to insert resistance in the circuit of said differential winding thereby to reduce the differential excitation effect of said winding.

20. In an excitation system for a direct current dynamoelectric machine having an armature and a field exciting winding, means including a source of substantially constant potential connected continuously to energize said winding, means for deriving a variable potential proportional to the current in said armature, and unidirectional conducting means connected for response to said variable potential to control the potential of at least one terminal of said field exciting winding.

21. In an excitation system for a direct current dynamoelectric machine having an armature and a field winding, means including a source of substantially constant potential connected continuously to energize said winding, and means for varying the potential of at least one terminal of said field exciting winding in accordance with the current in said armature.

22. In an excitation system for a direct current dynamoelectric machine having an armature and a field exciting winding, means including a source of substantially constant potential connected continuously to energize said winding, and means responsive to the current of said armature for controlling the potential of at least one terminal of said field exciting winding in accordance with armature currents above a predetermined minimum value.

23. A generator excitation system comprising a direct current generator having an output circuit, excitation means for said generator comprising a source of substantially constant potential and a field exciting winding connected for continuous energization from said source, and means including unidirectional conducting means for controlling the potential of at least one terminal of said field exciting winding in accordance with the current of said output circuit within a predetermined limited range of output circuit current.

24. A generator excitation system comprising a direct current generator having an output circuit, excitation means for said generator comprising a source of substantially constant potential and a field exciting winding connected for continuous energization from said source, and means for varying the potential of at least one terminal of said field exciting winding in accordance with the current of said output circuit to vary the energization of said winding inversely in accordance with said current.

25. A generator excitation system comprising a direct current generator having an output circuit, excitation means for said generator comprising a source of substantially constant potential and a field exciting winding connected for continuous energization from said source, and means including non-linear conducting means for varying the energization of one terminal of said field exciting winding directly in accordance with the magnitude of current in said output circuit over a predetermined limited range of output circuit currents.

26. A generator excitation system comprising a direct current generator having an output circuit, excitation means for said generator comprising a source of substantially constant potential and a field exciting winding having high and low potential terminals and connected for continuous energization from said source, a voltage divider connected across a portion of said output circuit, and unidirectional conducting means connected between said low potential terminal and an intermediate point on said voltage divider to raise the potential of said low potential terminal in accordance with the current in said output circuit, thereby to vary the net energization of said field exciting winding inversely as said current.

27. A generator excitation system comprising a direct current generator having an output circuit, excitation means for said generator comprising a source of substantially constant potential and a field exciting winding connected in series circuit relation with a resistor for continuous energization from said source, a voltage divider connected across a portion of said output circuit, and unidirectional conducting means connected across a portion of said voltage divider in series circuit relation with said resistor to control the potential of one terminal of said field exciting winding.

28. A generator excitation system comprising a direct current generator having an output circuit, excitation means for said generator comprising a source of substantially constant potential and a field exciting winding connected for energization from said source, said winding having one terminal connected through a resistor to a point of predetermined fixed potential, a voltage divider connected across a portion of said output circuit and having one terminal connected also to said point of fixed potential, and unidirectional conducting means for connecting a portion of said voltage divider in parallel circuit relation with said resistor to control the potential of said one terminal of said field exciting winding in accordance with the current of said output circuit.

29. A generator excitation system comprising a direct current generator having an output circuit, excitation means for said generator comprising a source of substantially constant potential and a field exciting winding connected for energization from said source, said winding having one terminal connected through a resistor to a point of predetermined fixed potential, a voltage divider connected across a portion of said output circuit and having one terminal connected also to said point of fixed potential, and means for connecting a portion of said voltage divider in parallel circuit relation with said resistor to control the potential of one terminal of said field exciting winding in accordance with the current in said output circuit.

30. A generator excitation system comprising a direct current generator having an output circuit, excitation means for said generator comprising a source of substantially constant potential and a field exciting winding connected for energization from said source, said winding having its low potential terminal connected through a resistor to a point of predetermined fixed potential, a voltage divider connected across a portion of said output circuit and having its low potential terminal connected also to said point of fixed potential, and unidirectional conducting means for connecting an intermediate point on said voltage divider to said low potential terminal of said field exciting winding, said intermediate point being so selected that said unidirectional conducting means is rendered conductive only upon the occurrence of a predetermined minimum current in said output circuit to raise the potential of said low potential terminal of said winding in accordance with currents in said output circuit exceeding said minimum value.

31. A generator excitation system comprising a direct current generator having an output circuit, excitation means for said generator comprising a source of substantially constant potential and a field exciting winding connected for continuous energization from said source, a voltage divider connected across a portion of said output circuit, and means for connecting an intermediate point of said voltage divider to control the potential of at least one terminal of said field exciting winding in accordance with the current in said output circuit.

32. A generator excitation system comprising a direct current generator having an output circuit, excitation means for said generator comprising a source of substantially constant potential and a field exciting winding connected in series circuit relation with a resistor for continuous energization from said source, a voltage divider connected across a portion of said output circuit, and means for connecting said resistor in parallel circuit relation with at least a portion of said voltage divider to control the potential of one terminal of said field exciting winding in accordance with the current in said output circuit.

33. A power system for a self-propelled electric vehicle comprising a prime mover, manually operable means for controlling the available power output of said prime mover, a direct current generator driven by said prime mover and arranged to supply current to an output circuit, a direct current traction motor having its armature connected in said output circuit, means for exciting the field of said traction motor in accordance with the current of said output circuit, and means controlled by said manually operable means for limiting the excitation of said generator to effect low speed operation of said vehicle without limiting the maximum output circuit current and available motor starting torque.

34. A power system for a self-propelled electric vehicle comprising a prime mover, a direct current generator driven by said prime mover and arranged to supply current to an output circuit, a direct current traction motor having its armature connected in said output circuit, means for exciting the field of said traction motor in accordance with the current in said output circuit, manually operable means movable sequentially to limit the available power output of said prime mover to a predetermined minimum value and to limit the excitation of said generator thereby to effect low speed operation of said motor, and means responsive to the current in said output circuit for nullifying the field controlling effect of said manually operable means when said output circuit current exceeds a predetermined value thereby to maintain the maximum available motor starting torque at said minimum prime mover power output independently of said manually operable means.

35. A power system for a self-propelled electric vehicle comprising an internal combustion engine, a direct current generator driven by said engine and arranged to supply current to an output circuit, a direct current traction motor having its armature connected in said output circuit, means for exciting the field of said traction motor in accordance with the current in said output circuit, manually operable means movable sequentially to limit the speed of said engine to a predetermined minimum value and to limit the excitation of said generator thereby to effect low speed operation of said vehicle, and means responsive to the current in said output circuit for nullifying the field controlling effect of said manually operable means when said output circuit current exceeds a predetermined value thereby to maintain the maximum available motor starting torque at said minimum engine speed independently of field limiting positioning of said manually operable means.

36. A power system for a self-propelled electric vehicle comprising an internal combustion engine, a direct current generator driven by said engine and arranged to supply current to an output circuit, a direct current traction motor having its armature connected in said output circuit, means for exciting the field of said traction motor in accordance with the current in said output circuit, and means operable sequentially to limit the speed of said engine to a predetermined minimum speed and to limit the excitation of said generator thereby to maintain a low vehicle speed, said means including means responsive to the current in said output circuit and operable to limit said generator excitation only when the current in said circuit is less than a predetermined value approximately equal to the output circuit current with said vehicle at standstill and said engine operating at said minimum speed.

37. A power system comprising a prime mover, a direct current generator driven by said prime mover and arranged to supply current to an output circuit, excitation means for said generator including a source of substantially constant potential and a field exciting winding for said generator connected for energization from said source, manually operable means for controlling the available power output of said prime mover, a voltage divider connected across a portion of said output circuit, unidirectional conducting means connected to an intermediate point on said voltage divider and arranged inversely to control the energization of said field exciting winding in accordance with the current of said output circuit, and means controlled by said manually operable means for limiting the energization of said winding from said source.

38. A power system comprising a prime mover, a direct current generator driven by said prime mover and arranged to supply current to an output circuit, excitation means for said generator comprising a source of substantially constant potential and a field exciting winding for said generator connected in series circuit relation with a resistor for energization from said source, manually operable means for controlling the available power output of said prime mover, a voltage divider connected across a portion of said output circuit, unidirectional conducting means connected from an intermediate point on said divider automatically to control the voltage drop across said resistor in accordance with current of said output circuit above a predetermined minimum value thereby to control the energization of said field exciting winding, and means controlled by said manually operable means for controlling the connection of said winding and said resistor to said source to determine said predetermined minimum current value.

39. A power system comprising a prime mover, a direct current generator driven by said prime mover and arranged to supply current to an output circuit, excitation means for said generator including a source of substantially constant potential and a field exciting winding for said generator connected for energization from said source, manually operable means for controlling the available power output of said prime mover, a voltage divider connected across a portion of said output circuit, unidirectional conducting means connected from an intermediate point on said voltage divider automatically to control the potential of one terminal of said field exciting winding in accordance with the current in said output circuit above a first predetermined value, and means controlled by said manually operable means for connecting a second intermediate point on said voltage divider automatically to control the potential of the other terminal of said field exciting winding in accordance with output circuit currents below a second predetermined value.

40. A power system comprising a prime mover, a direct current generator driven by said prime mover and arranged to supply current to an output circuit, excitation means for said generator comprising a source of substantially constant potential and a field exciting winding for said generator connected for energization from said source, manually operable means for controlling the available power output of said prime mover, a voltage divider connected across a portion of said output circuit, unidirectional conducting means connected between an intermediate point on said voltage divider and the low potential terminal of said field exciting winding to vary the energization of said field exciting winding inversely in accordance with currents above a first predetermined value in said output circuit, and means controlled by said manually operable means for connecting an intermediate point of lower potential on said voltage divider to the high potential terminal of said field exciting winding to vary the energization of said field exciting winding directly in accordance with currents in said output circuit less than a second predetermined value.

41. A generator excitation system comprising a direct current generator having an output circuit, excitation means for said generator comprising a source of substantially constant potential and a field exciting winding connected for energization from said source, a voltage divider connected across a portion of said output circuit, non-linear unilateral conducting means connected to an intermediate point on said voltage divider for controlling the potential of one terminal of said field exciting winding, and means for connecting a second intermediate point on said voltage divider to control the potential of the other terminal of said field exciting winding.

42. A generator excitation system comprising a direct current generator having an output circuit, excitation means for said generator comprising a source of substantially constant potential and a field exciting winding connected for energization from said source, a voltage divider connected across a portion of said output circuit, non-linear unidirectional conducting means connected to an intermediate point on said voltage divider automatically to control the potential of one terminal of said field exciting winding in accordance with the current of said output circuit above a predetermined minimum value, manually controllable means for selecting the connection of said winding to said source to control the potential of said one terminal of said winding thereby to select said minimum current value, and means for connecting a second intermediate point on said voltage divider to control the potential of the other terminal of said field exciting winding.

43. A power system for an electrically driven vehicle comprising a prime mover, manually operable means for controlling the available power output of said prime mover, a direct current generator arranged to be driven by said prime mover and having an output circuit, a direct current motor having its armature connected in said output circuit, a separately excited field winding for said motor arranged to control the torque and direction of rotation of said motor, excitation means for said generator comprising a source of substantially constant potential and a field exciting winding having high and low potential terminals connected for energization from said source, means responsive to the current of said output circuit for controlling the potential of one of said terminals to vary the energization of said winding inversely as said current within a predetermined range of current, and means actuated by said manually operable means for controlling the potential of one of said terminals to limit the energization of said field winding at a predetermined low available power output of said prime mover.

44. A power system for a self-propelled electric vehicle comprising a prime mover, manually operable means for controlling the available power output of said prime mover, a direct current generator driven by said prime mover and having an output circuit, a direct current traction motor having its armature connected in said output circuit, a separately excited field winding for controlling the torque and direction of rotation of said motor, excitation means for said generator arranged to maintain in said output circuit a circulating unidirectional current and comprising a source of substantially constant potential and a field exciting winding, means including a resistor for connecting said field exciting winding for energization from said source, means including a unidirectional conducting device and responsive to the current of said output circuit for controlling the potential of one terminal of said field exciting winding to vary the energization of said winding inversely as said current whenever said current exceeds a predetermined minimum value, and means actuated by said manually operable means to control the potential of one terminal of said field exciting winding for selecting said minimum current value.

45. A power system for a self-propelled electric vehicle comprising a prime mover, manually operable means for controlling the available power output of said prime mover, a direct current generator driven by said prime mover and having an output circuit, a direct current traction motor having its armature connected in said output circuit, a separately excited field winding for controlling the torque and direction of rotation of said motor, excitation means for said generator arranged to maintain in said output circuit a circulating unidirectional current and comprising a source of substantially constant potential and a field exciting winding, means including a resistor connected to one terminal of said field exciting winding for connecting said winding for energization from said source, means including a unidirectional conducting device and responsive to the current of said output circuit for controlling the potential of said one terminal of said field exciting winding to vary the energization of said field exciting winding inversely as said current whenever said current exceeds a predetermined minimum value, and means actuated by said manually operable means for controlling the potential of said one terminal of said field exciting winding to limit the energization of said field exciting winding and to increase said minimum current value without affecting the available power output of said prime mover.

46. A power system for a self-propelled electric vehicle comprising an internal combustion engine, manually operable means for controlling the speed of said internal combustion engine, a direct current generator driven by said engine and having an output circuit, a direct current traction motor having its armature connected in said output circuit, a separately excited field winding for controlling the torque and direction of rotation of said traction motor, excitation means for said generator arranged to maintain in said output circuit a circulating unidirectional current and comprising a source of substantially constant potential and a field exciting winding, means for connecting said field exciting winding for energization from said source, means including a unidirectional conducting device responsive to the current of said output circuit for automatically controlling the potential of one terminal of said field exciting winding to vary the energization of said winding inversely as said current whenever said current exceeds a predetermined minimum value, and means actuated by said manually operable means without affecting the speed of said engine for sequentially limiting the maximum energization of said winding and controlling said energization directly in accordance with said current as said current is reduced.

47. A power system for a self-propelled electric vehicle comprising an internal combustion engine, manually operable means for controlling the speed of said engine, a direct current generator driven by said engine and arranged to supply current to an output circuit, a direct current traction motor having its armature connected in said output circuit, a separately excited field winding for said motor arranged to control the torque and direction of rotation of said motor, excitation means for said generator arranged to maintain in said output circuit a circulating unidirectional current and comprising a source of substantially constant potential and a field exciting winding, means including a resistor connected between the low potential terminal of said field exciting winding and a point of fixed potential for connecting said winding for energization from said source, a voltage divider connected across a portion of said output circuit and having one terminal connected to said point of fixed potential, unidirectional conducting means connected from an intermediate point on said voltage divider automatically to raise the potential of said low potential terminal of said field exciting winding in accordance with said current whenever said current exceeds a predetermined minimum value, means actuated by said manually operable means after reduction of said engine speed to a minimum sequentially to increase the minimum potential of said low potential terminal and to connect a second intermediate point on said voltage divider to the high potential terminal of said field exciting winding thereby to limit the energization of said winding and effect low speed operation of said vehicle without affecting said engine speed or limiting the maximum available standstill torque of said motor at said minimum engine speed.

48. An excitation system for a direct current dynamoelectric machine comprising a source of substantially constant potential, a source of variable potential having one terminal connected to a point of fixed potential, a field exciting winding for said dynamoelectric machine connected for energization from said source of variable potential, and non-linear conducting means connecting said constant potential source to fix the potential of one terminal of said field exciting winding.

49. An excitation system for a direct current dynamoelectric machine comprising a source of substantially constant potential, a source of variable potential having one terminal connected to one terminal of said source of constant potential, a field exciting winding for said dynamoelectric machine connected in series circuit relation with a resistor for energization from said source of variable potential, a voltage divider connected across said source of constant potential, and non-linear conducting means connected between an intermediate point on said voltage divider and one terminal of said field exciting winding to control the rate of change of energization of said winding with respect to the potential of said variable source over a predetermined range of said variable potential.

50. An excitation system for a direct current dynamoelectric machine comprising a source of substantially constant potential, a field exciting winding for said dynamoelectric machine, means for supplying to the terminals of said field exciting winding a voltage varying substantially linearly with an operating characteristic of said machine, voltage dividing means connected across said source of substantially constant potential, and unidirectionally conducting means connected between said voltage dividing means and said field winding for controlling the rate of change of voltage of at least one terminal of said field winding to limit the energization of said field winding to a predetermined maximum value.

51. A direct current electric motor control system comprising a field exciting winding for controlling the excitation of said motor, a source of substantially constant voltage, a second source of voltage substantially proportional to the speed of said motor and having one terminal connected to one terminal of said constant voltage source, means connecting said field exciting winding for energization from said second source of voltage, and means discontinuously responsive to a predetermined energization of said field exciting winding for connecting at least one terminal of said winding to said source of constant voltage thereby to limit the energization of said field exciting winding from said second voltage source.

52. A direct current electric motor control system comprising a field exciting winding for controlling the excitation of said motor, a source of substantially constant voltage and a source of voltage substantially proportional to the speed of said vehicle having terminals of like polarity connected together, means connecting said field exciting winding for energization from said source of voltage proportional to motor speed, voltage dividing means connected across said source of constant voltage, and unidirectional conducting means connected between an intermediate point on said voltage dividing means and a terminal of said field exciting winding remote from the common terminal of said voltage sources to control the rate of change of energization of said field exciting winding at speeds exceeding a predetermined minimum speed.

53. A direct current electric motor control system comprising a field exciting winding for controlling the excitation of said motor, a source of substantially constant voltage and a source of voltage substantially proportional to the speed of said motor having terminals of like polarity connected together, means connecting said field exciting winding for energization from said source of voltage proportional to speed comprising a voltage divider connected across said source and a resistor connected between one terminal of said winding and the terminal of said voltage divider electrically most remote from the common terminal of said voltage sources, a second voltage divider connected across said source of constant voltage, and a unidirectional conducting device connected between an intermediate point on said second voltage divider and said one terminal of said field exciting winding to reduce the rate of change of energization of said field exciting winding with motor speed above a predetermined minimum speed.

54. A direct current electric motor control system comprising main and differential field exciting windings for controlling the excitation of said motor, means for energizing said main field exciting winding in accordance with the armature current of said motor, a source of voltage substantially proportional to the speed of said motor for energizing said differential field exciting winding, a source of substantially constant potential having one terminal connected to the terminal of like polarity of said source of voltage proportional to the speed, and means for limiting the energization of said differential field exciting winding comprising voltage dividing means connected across said source of constant potential and unidirectionally conducting means connected between an intermediate point on said voltage dividing means and one terminal of said differential field exciting winding to reduce the rate of change of potential of said one terminal of said winding with motor speeds above a predetermined speed.

55. An electric vehicle control system comprising a direct current traction motor having an armature, field excitation means for said motor comprising main and differential field exciting windings, means for energizing said main field exciting winding in accordance with the current in said motor armature, means responsive to the speed of said vehicle for energizing said differential field exciting winding, and means for limiting the energization of said differential field exciting winding comprising a source of substantially constant potential and unidirectionally conducting means for connecting said source of constant potential to one terminal of said differential field exciting winding to control the rate of change of voltage of said one terminal of said winding with vehicle speed above a predetermined speed.

56. An electric vehicle control system comprising a direct current electric traction motor having an armature, field excitation means for said traction motor including main and differential field exciting windings, means for energizing said main field exciting winding in accordance with the current of said motor armature, a source of substantially constant voltage and a source of voltage substantially proportional to the speed of said vehicle having terminals of like polarity connected together, means for energizing said differential field exciting winding from said source of voltage proportional to speed comprising a voltage divider connected across said source and a resistor connected between one terminal of said differential field exciting winding and the terminal of said voltage divider electrically most remote from the common terminal of said voltage sources, a second voltage divider connected across said source of constant voltage, and a unidirectional conducting device connected between an intermediate point on said second voltage divider and said one terminal of said differential field exciting winding to reduce the rate of change of energization of said differential field exciting winding with vehicle speeds above a predetermined speed.

57. A power system for a self-propelled electric vehicle comprising an internal combustion engine, a generator driven by said engine and arranged to supply current to an output circuit, a direct current traction motor having its armature connected in said output circuit, means for exciting said generator differentially in accordance with the current in said output circuit, excitation means for said traction motor comprising main and differential field exciting windings, means for energizing said main field exciting winding in accordance with the current in said output circuit, means for energizing said differ-
ential field exciting winding in accordance with the speed of said vehicle, and means for limiting energization of said differential field exciting winding at speeds above a predetermined vehicle speed comprising a source of substantially constant potential and unidirectionally conducting means connected from said source to one terminal of said differential field exciting winding.

58. A power system for a self-propelled electric vehicle comprising an internal combustion engine, a direct current generator driven by said engine and arranged to supply current to an output circuit, a direct current traction motor having its armature connected in said output circuit, means for exciting said generator differentially in accordance with the current of said output circuit, field excitation means for said traction motor comprising main and differential field exciting windings, means for energizing said main field exciting winding in accordance with the current of said output circuit, a source of voltage substantially proportional to the speed of said vehicle, means for connecting said voltage source to vary the potential of at least one terminal of said differential field exciting winding in accordance with said speed to control the energization of said differential winding, and means for reducing the rate of change of energization of said differential field exciting winding with vehicle speed above a predetermined speed comprising a source of substantially constant potential connected through a unidirectionally conducting device to control the potential of said one terminal of said differential field exciting winding.

59. A power system for a self-propelled electric vehicle comprising an internal combustion engine, a direct current generator driven by said engine and arranged to supply current to an output circuit, a direct current traction motor having its armature connected in said output circuit, means for exciting said generator differentially in accordance with the current in said output circuit, means for controlling the excitation of said generator to limit said current to a predetermined maximum value, excitation means for said traction motor comprising main and differential field exciting windings, means for energizing said main field exciting winding in accordance with the current in said output circuit, means for energizing said differential field exciting winding in accordance with the speed of said vehicle comprising a source of voltage proportional to said speed connected to vary the potential of at least one terminal of said differential field exciting winding in accordance with vehicle speed, and means for maintaining the current in said output circuit substantially constant over a wide range of vehicle speeds comprising a source of substantially constant potential, voltage dividing means connected across said source of constant potential, and unidirectionally conducting means connected between at least two electrically spaced intermediate points of said voltage dividing means and said one terminal of said differential field exciting winding successively to control the potential of said one terminal and to limit the energization of said differential winding to a predetermined maximum value.

60. In an electric motor control system, a direct current motor having an armature and a field exciting winding, means connecting said armature to a source of electric current supply, means for limiting the current from said source to a predetermined maximum value, excitation means for said motor comprising main and differential field exciting windings, means for normally energizing said differential field exciting winding comprising a source of potential substantially proportional to the speed of said motor over a predetermined range of motor speeds, means for increasing the rate of change of potential of said source with motor speed over a second range of motor speeds, and means for limiting the speed of said motor comprising a source of substantially constant potential and a unidirectionally conducting device for connecting said sources of potential in opposing relation through said differential field exciting winding abruptly to increase the energization of said differential winding at a speed within said second range of speeds thereby to reduce the excitation and power output of said motor.

61. In an electric motor control system, a direct current motor having an armature and a field exciting winding, means for connecting said armature to a source of electric current supply, means for limiting the current from said source to a predetermined maximum value, excitation means for said motor comprising main and differential field exciting windings, a tachometer generator for supplying to said differential field exciting winding a voltage varying substantially directly with the speed of said motor over a predetermined range of motor speeds, a source of substantially constant potential, an auxiliary field exciting winding for said tachometer generator, unidirectionally conducting means for connecting said constant potential source in opposing relation to the voltage of said tachometer generator through said auxiliary field exciting winding thereby to increase the rate of change of voltage of said tachometer with motor speed above a first predetermined speed, and means for limiting the speed of said motor to a predetermined maximum speed greater than said first predetermined speed comprising additional unidirectionally conducting means connecting said constant voltage source in opposing relation to the voltage of said tachometer through said differential field exciting winding thereby abruptly to decrease the excitation and power output of said motor.

62. A power system for a self-propelled electric vehicle comprising a prime mover, a direct current generator driven by said prime mover and arranged to supply current to an output circuit, a direct current motor having its armature connected in said output circuit, means operable in conjunction with said generator to limit the current in said output circuit to a predetermined maximum value, excitation means for said motor comprising main and differential field exciting windings, means for energizing said main field exciting winding in accordance with the current in said output circuit, a tachometer generator having a main constantly energized field exciting winding for normally supplying to said differential field exciting winding an energizing voltage proportional to the speed of said vehicle, a source of substantially constant potential, means for increasing the rate of change of voltage of said tachometer generator with vehicle speed comprising an auxiliary field exciting winding for said tachometer generator and a unidirectionally conducting device connecting said constant potential source in opposing relation to the voltage of said tachometer generator through said auxiliary field exciting winding thereby to increase the rate of change of tachometer voltage at a first predetermined vehicle speed, and means for limiting the speed of said vehicle comprising a second unidirectionally conducting device for connecting said constant potential source in opposing relation to the voltage of said tachometer generator through said differential field exciting winding abruptly to increase the energization of said differential winding at a second predetermined speed in excess of said first predetermined speed.

63. A power system for a self-propelled electric vehicle comprising a prime mover, a generator driven by said prime mover and arranged to supply current to an output circuit, a direct current electric traction motor having its armature connected in said output circuit, excitation means for said generator comprising a field exciting winding, a source of substantially constant potential connected to supply excitation current to said winding, means responsive to the current in said output circuit for controlling the energization of said field exciting winding differentially in accordance with said current, excitation means for said motor including main and differential field exciting windings, means for energizing said main field exciting winding in accordance with the current of said output circuit, means for energizing said differential field exciting winding in accordance with the speed of said vehicle, and means including a source of substantially constant potential for limiting the energization of said differential field exciting winding to a predetermined maximum value, whereby a substantially constant circulating current is maintained in said output circuit over a wide range of vehicle speeds.

64. A power system for a self-propelled electric vehicle comprising an internal combustion engine, a generator driven by said engine and arranged to supply current to an output circuit, a direct current electric traction motor having its armature connected in said output circuit, excitation means for said generator comprising main and differential field exciting windings, a source of substantially constant potential connected to energize said main field exciting winding, means responsive to the current of said output circuit and including unidirectional conducting means connected to at least one terminal of said main field exciting winding for varying the excitation of said generator differentially in accordance with output circuit currents above a predetermined minimum value, additional means responsive to the current of said output circuit for energizing said differential field exciting winding to limit the current of said output circuit to a predetermined maximum value, excitation means for said motor comprising main and differential field exciting windings, means for energizing said main motor field exciting winding in accordance with the current of said output circuit, means for energizing said differential motor field exciting winding in accordance with the speed of said vehicle, means including a source of substantially constant potential and a unidirectionally conducting device connected to said differential motor field exciting winding for normally limiting the energization of said winding to a predetermined maximum value, and additional means responsive to the speed of said vehicle for abruptly increasing the energization of said differential motor field exciting winding to decrease the power output of said motor and limit the speed of said vehicle to a predetermined maximum value.

65. An electric control system comprising an electrical load element having a pair of terminals, a source of fixed potential and a source of variable potential, means connecting said load element directly for energization from one of said sources, and non-linear unilateral conducting means for controlling the potential of one terminal of said load element in accordance with the potential of the other of said sources.

66. An electric control system comprising an electrical load element having a pair of terminals, a source of substantially constant potential and a source of variable potential, means connecting said load element directly for energization from said variable source, and non-linear unilateral conducting means for controlling the potential of one terminal of said load element independently of said variable source over a predetermined range of potential variation of said variable source.

67. An electric control system comprising an electrical load element having a pair of terminals, a source of substantially constant potential and a source of variable potential, means connecting said load element directly for energization from said variable source, and a plurality of non-linear unilateral conducting devices connected between said source of constant potential and said load element sequentially to control the potential of one terminal of said load element independently of said variable source over predetermined ranges of potential variation of said variable source.

68. An electric control system comprising a direct current electrical load element having a pair of terminals, a source of substantially constant potential, a source of variable potential having one terminal connected to a point of fixed potential, means connecting said load element directly for energization from said variable potential source, and non-linear unilateral conducting means connecting one terminal of said load element to a plurality of points of different potential on said constant potential source for sequentially controlling the rate of change of energization of said load element with respect to said variable potential source over a plurality of ranges in potential.

69. An excitation system for a dynamoelectric machine comprising a source of substantially constant potential, a field exciting winding for said dynamoelectric machine, means for supplying to the terminals of said field exciting winding a voltage varying in accordance with a characteristic of said machine, a plurality of voltage dividing means connected across said constant potential source, and non-linear unilateral conducting means connected between internal points of said voltage dividing means and said field exciting winding sequentially to control the rate of change of energization of said field exciting winding over a plurality of ranges of variation of said characteristic.

GEORGE M. ADAMS.
HAROLD G. MOORE.